(12) United States Patent
Kawamoto et al.

(10) Patent No.: US 10,269,132 B2
(45) Date of Patent: Apr. 23, 2019

(54) DISPLAYING IMAGES ACCORDING TO HEAD POSTURE AND CAMERA POSTURE

(71) Applicant: Sony Corporation, Tokyo (JP)

(72) Inventors: Kenta Kawamoto, Tokyo (JP); Hirokazu Tatsuta, Kanagawa (JP); Yuichiro Koyama, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 15/324,376

(22) PCT Filed: May 18, 2015

(86) PCT No.: PCT/JP2015/064229
§ 371 (c)(1),
(2) Date: May 23, 2017

(87) PCT Pub. No.: WO2016/017245
PCT Pub. Date: Feb. 4, 2016

(65) Prior Publication Data
US 2017/0278262 A1 Sep. 28, 2017

(30) Foreign Application Priority Data
Jul. 31, 2014 (JP) .................... 2014-155882

(51) Int. Cl.
*H04N 5/225* (2006.01)
*G06T 7/70* (2017.01)
(Continued)

(52) U.S. Cl.
CPC ............... *G06T 7/70* (2017.01); *B64C 39/02* (2013.01); *G02B 27/0179* (2013.01);
(Continued)

(58) Field of Classification Search
CPC ................ H04N 5/2258; G06T 7/70
(Continued)

(56) References Cited

U.S. PATENT DOCUMENTS 5,841,409 A  11/1998  Ishibashi et al.
5,905,525 A   5/1999  Ishibashi et al.
(Continued)

FOREIGN PATENT DOCUMENTS

EP    1435737 A1   7/2004
JP    09-037137    2/1997
(Continued)

OTHER PUBLICATIONS

International Search Report from PCT/JP2015/064229, dated Jul. 28, 2015. (3 pgs.).
(Continued)

*Primary Examiner* — Usman A Khan
(74) *Attorney, Agent, or Firm* — Lerner, David, Littenberg. Krumholz & Mentlik, LLP

(57) ABSTRACT

[Object] To process an image captured by a camera mounted on a moving object device or a user to be suitable for display on an image display device fixed to the head or face of the user.
[Solution] The image rendering processor 1042, in the beginning, corrects the user's head posture angle $q_h$ using the camera posture angle $q_c$ (F1421), and clips a display angle of view depending on the corrected user's head posture angle $q_h^*$ from the captured image to render a free viewpoint image (F1422). Then, the image processing device 1040 transmits the free viewpoint image rendered by the image rendering processor 1042 to the display device 1020 via the communication unit 1041, and the image is displayed on the display device 1020 (F1430).

8 Claims, 22 Drawing Sheets

(51) Int. Cl.
*B64C 39/02* (2006.01)
*G09F 9/00* (2006.01)
*H04N 5/64* (2006.01)
*H04N 7/18* (2006.01)
*G02B 27/01* (2006.01)
*G06F 3/01* (2006.01)
*H04N 5/232* (2006.01)

(52) U.S. Cl.
CPC .............. *G06F 3/011* (2013.01); *G06F 3/012* (2013.01); *G09F 9/00* (2013.01); *H04N 5/23238* (2013.01); *H04N 5/64* (2013.01); *H04N 7/18* (2013.01); *G02B 2027/0183* (2013.01); *G06T 2207/30244* (2013.01); *H04N 5/2258* (2013.01); *H04N 5/23293* (2013.01)

(58) Field of Classification Search
USPC ..................................................... 348/207.99
See application file for complete search history.

(56) References Cited

U.S. PATENT DOCUMENTS

| | | |
|---|---|---|
| 2007/0247457 A1 | 10/2007 | Gustafsson et al. |
| 2011/0140994 A1 | 6/2011 | Noma |
| 2014/0092207 A1* | 4/2014 | Saito .................. H04N 5/23238 |
| | | 348/36 |
| 2015/0293362 A1* | 10/2015 | Takahashi .............. G02B 27/02 |
| | | 348/47 |

FOREIGN PATENT DOCUMENTS

| | | |
|---|---|---|
| JP | 09-106322 A | 4/1997 |
| JP | 10-337145 | 12/1998 |
| JP | 2001209426 A | 8/2001 |
| JP | 2004064639 A | 2/2004 |
| JP | 2007232621 A | 9/2007 |
| JP | 2010256534 A | 11/2010 |
| JP | 2011128220 A | 6/2011 |
| JP | 2011183824 A | 9/2011 |
| JP | 2012141461 A | 7/2012 |
| JP | 2012143447 A | 8/2012 |
| JP | 2012151800 A | 8/2012 |
| JP | 2014063411 A | 4/2014 |
| JP | 2014104797 A | 6/2014 |
| WO | 2014077046 A1 | 5/2014 |

OTHER PUBLICATIONS

Extended European Search Report including Written Opinion for EP15826680.9 dated Mar. 28, 2018.
First Office Action in Chinese Application 201580041249.X dated Jan. 28, 2019.

* cited by examiner

OMNIDIRECTIONAL CAMERA 400

FIG.15
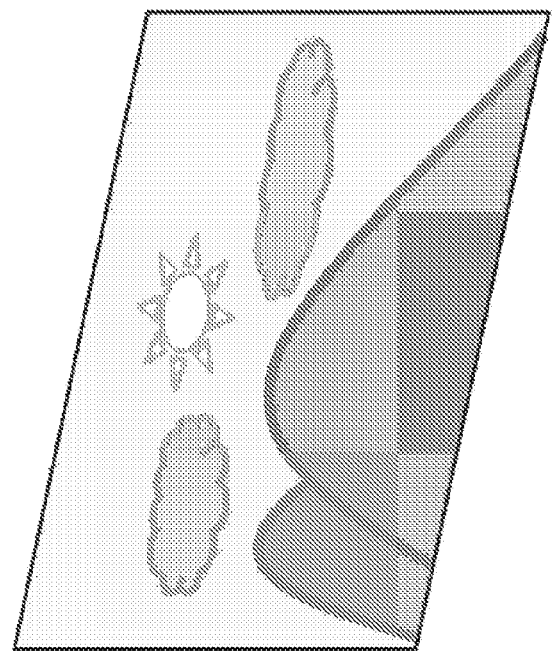
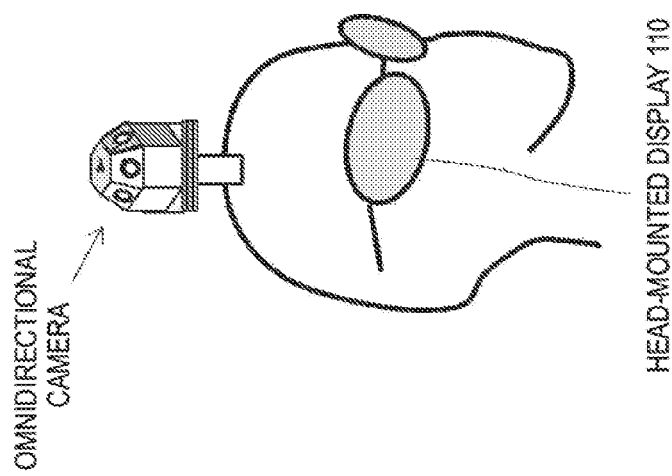

DISPLAYING IMAGES ACCORDING TO HEAD POSTURE AND CAMERA POSTURE

CROSS-REFERENCE TO RELATED APPLICATIONS

This application is a national phase entry under 35 U.S.C. § 371 of International Application No. PCT/JP2015/064229 filed May 18, 2015, which claims the priority from Japanese Patent Application No. 2014-155882, filed in the Japanese Patent Office on Jul. 31, 2014.

TECHNICAL FIELD

The technology disclosed herein relates to an information processing device, method of information processing, and image display system, allowing an image captured by a camera that is mounted on a moving object device or a user to be processed.

BACKGROUND ART

An image display device, i.e., head-mounted display, fixed to the head or face of a user who observes an image is known. The head-mounted display is provided with an image display unit on both the right and left eyes and is configured to be capable of controlling visual and auditory perception using together with a headphone. The configuration for blocking the outside world entirely when it is worn on the head augments virtual reality during viewing. Furthermore, the head-mounted display is capable of projecting a different video image onto each of the left and right eyes and is capable of presenting a 3D image by displaying an image having parallax on the left and right eyes.

This type of head-mounted display forms a virtual image on the retina of the eye to allow the user to observe it. In this regard, the virtual image is formed on the side of an object in a case where the object is situated closer to the lens than the focal length. In one example, there is developed a head-mounted display that forms an enlarged virtual image of a displayed image on the user's pupil by placing a virtual image optical system of a wide viewing angle to be spaced by 25 millimeters away from the front of the pupil and by placing a display panel having a size of the effective pixel range of about 0.7 inches further in front of the wide viewing angle optical system (e.g. see Patent Literature 1).

Moreover, the user is able to observe an image obtained by clipping a part of the wide-angle image using this type of head-mounted display. In one example, there is developed a head-mounted display that allows reality experience of a video image of the whole space of 360 degrees to be achieved by installing a head motion tracking device including a gyro sensor or the like on the head and by causing it to track the movement of the user's head (see Patent Literatures 2 and 3). The movement of a display region in the wide-angle image to cancel the head's movement detected by a gyro sensor makes it possible to reproduce an image that tracks the head's movement, and thus the user experiences as if he looks a panoramic view of the entire space.

Furthermore, there are also known first person view (FPV) techniques that pilot while viewing a first person viewpoint (pilot viewpoint) image captured by a wireless camera mounted on a radio-controlled device such as a helicopter. In one example, a moving object control device composed of a moving object equipped with an image capturing device and a wearable PC for remotely controlling the moving object through an operator's operation is developed (e.g. see Patent Literature 4). The moving object side receives a signal for controlling the moving object's operation to control its own operation, receives a signal for controlling an image capturing device equipped thereon to control the image capturing operation, and transmits video and audio signals outputted from the image capturing device to the wearable PC. Meanwhile, the wearable PC side generates a signal for controlling an operation of the moving object in response to the operator's operation, generates a signal for controlling an operation of the image capturing device in response to the operator's voice. The wearable PC side transmits wirelessly the generated signal to the moving object, receives wirelessly a signal outputted from the image capturing device, reproduces a video signal, and displays it on a monitor screen.

Furthermore, a network system is developed in which a radio-controlled car equipped with a three-dimensional stereo camera for medium-to-long distance and a three-dimensional stereo camera for short distance transmits a three-dimensional composite image to be displayed on a controller side (e.g. see Patent Literature 5). A network system is developed in which a model device captures an image of an area in front of the model device and a controller side receives information on the image, position, and direction of the model device, generates a virtual image based on the position and direction, and displays it (e.g. see Patent Literature 6).

CITATION LIST

Patent Literature

Patent Literature 1: JP 2012-141461A
Patent Literature 2: JP H9-106322A
Patent Literature 3: JP 2010-256534A
Patent Literature 4: JP 2001-209426A
Patent Literature 5: JP 2012-151800A
Patent Literature 6: JP 2012-143447A

DISCLOSURE OF INVENTION

Technical Problem

An object of the technology disclosed herein is to provide an improved information processing device, method of information processing, and image display system, capable of processing preferably an image captured by a camera that is mounted on a moving object device or a user.

Furthermore, another object of the technology disclosed herein is to provide an improved information processing device, method of information processing, and image display system, capable of processing an image captured by a camera to be displayed suitably on an image display device that is fixed to the user's head or face.

Solution to Problem

The technology disclosed herein has been devised in view of the problem, a first aspect thereof is an information processing device including: a head posture acquisition unit configured to acquire information on head posture of a user; a camera posture acquisition unit configured to acquire information on posture of a camera; and an image rendering processor configured to generate an image to be displayed on a display device from an image captured by the camera based on the head posture of the user and the posture of the camera, the display device being fixed to a head or a face of the user.

According to a second aspect of the technology disclosed herein, tin the information processing device according to the first aspect, the camera is mounted on a moving object device.

According to a third aspect of the technology disclosed herein, the camera of the information processing device according to any one of the first and second aspects is configured to capture an omnidirectional image or a wide-angle image, and the image rendering processor is configured to correct the head posture of the user using the posture of the camera in capturing and generate an image obtained by clipping an angle of view depending on the corrected head posture of the user from the image captured by the camera.

According to a fourth aspect of the technology disclosed herein, in the information processing device according to the first aspect, the camera is fixedly mounted on the head or the face of the user.

According to a fifth aspect of the technology disclosed herein, the image rendering processor of the information processing device according to the fourth aspect is configured to generate an image obtained by clipping an angle of view depending on a first conversion parameter from the image captured by the camera, the first conversion parameter being used to convert the posture of the camera to the head posture of the user.

According to a sixth aspect of the technology disclosed herein, the image rendering processor of the information processing device according to the fifth aspect is configured to perform image generation using the head posture of the user at a time when the camera performs capturing and the head posture of the user predicted after a lapse of delay time until an image is displayed on the display device.

According to a seventh aspect of the technology disclosed herein, the image rendering processor of the information processing device according to the first aspect is configured to construct a three-dimensional model of surrounding environment based on data of time-series image captured by the camera, estimate a current position of the camera in the three-dimensional model, predict a position and posture of an eye of the user after a lapse of delay time from capturing by the camera to displaying on the display device using a second conversion parameter used to convert a position and posture of the camera to the position and posture of the eye of the user, and generate an image captured in a predicted position and posture of the eye from the three-dimensional model.

According to an eighth aspect of the technology disclosed herein, the information processing device according to the first aspect further includes: a controller configured to remotely operate the moving object device; and a filter configured to constrain a trajectory of the moving object device and cut off an input other than the constrained trajectory from the controller. The input from the controller is configured to be converted to a position command, a velocity command, or an acceleration command in a direction along the constrained trajectory for transmitting to the moving object device.

According to a ninth aspect of the technology disclosed herein, the information processing device according to the eighth aspect is configured in a manner that, when the trajectory of the moving object device is constrained to a straight motion, the filter cuts off an input other than a back-and-front direction from the controller, and transmits a command to maintain a trajectory of the straight motion to the moving object device.

According to a tenth aspect of the technology disclosed herein, the information processing device according to the ninth aspect is configured in a manner that, the trajectory is set to a straight line toward a current direction of travel through a current point of the moving object or to a straight line connecting the current point of the moving object device and a destination point.

According to an eleventh aspect of the technology disclosed herein, the information processing device according to the eighth aspect is configured in a manner that, when the trajectory of the moving object device is constrained to a circular motion, the filter cuts off an input other than a left-and-right direction from the controller, and transmits a command to maintain a trajectory of the circular motion to the moving object device and controls posture of the moving object device to be directed toward a destination point.

According to a twelfth aspect of the technology disclosed herein, the information processing device according to the eleventh aspect is configured in a manner that the trajectory is set to a circular motion passing through a current point of the moving object device centered on a destination point or to a circular motion in a horizontal plane through the current point of the moving object device centered on a perpendicular axis intersecting a destination point.

A thirteenth aspect of the technology disclosed herein is a method of information processing, the method including: a head posture acquisition step of acquiring information on head posture of a user; a camera posture acquisition step of acquiring information on posture of a camera; and an image rendering processing step of generating an image to be displayed on a display device from an image captured by the camera based on the head posture of the user and the posture of the camera, the display device being fixed to a head or a face of the user.

A fourteenth aspect of the technology disclosed herein is an image display system including: a camera; a display device used while being fixed to a head or a face of a user; and an image processing device configured to generate an image to be displayed on the display device from an image captured by the camera based on the head posture of the user and the posture of the camera.

While the expression "system" is herein used to refer to a logical grouping of a plurality of devices (and/or functional modules that implement specific functions), and it does not matter whether each device and/or functional module is included in a single housing.

Advantageous Effects of Invention

According to the technology disclosed herein, it is possible to provide an improved information processing device, method of information processing, and image display system, capable of processing preferably an image captured by a remote camera installed in a moving object or a user to be displayed suitably on an image display device fixed to the user's head or face.

Note that the advantageous effects described in this specification are merely for the sake of example, and the advantageous effects of the present invention are not limited thereto. Furthermore, in some cases the present invention may also exhibit additional advantageous effects other than the above-mentioned advantageous effects.

The other objects, features, and advantages of the technology disclosed herein will be clarified by a more detailed description based on the exemplary embodiments discussed hereinafter and the attached drawings.

BRIEF DESCRIPTION OF DRAWINGS

FIG. 15 is a diagram illustrating an exemplary configuration of the video see-through image display system 100.

MODE(S) FOR CARRYING OUT THE INVENTION

An embodiment of the technology disclosed herein will be described in more detail with reference to the drawings. In the following description, an omnidirectional image or an omnidirectional camera is fundamentally used as an illustrative example. However, even in a case where a wide-angle image or a wide-angle camera is used, it can be treated similarly to the case of the omnidirectional image by considering an omnidirectional image in which other regions than a shooting angle of view are entirely painted with, for example, a color of black or a camera outputting this image, and thus the technology disclosed herein has no loss of generality.

Figure 1:
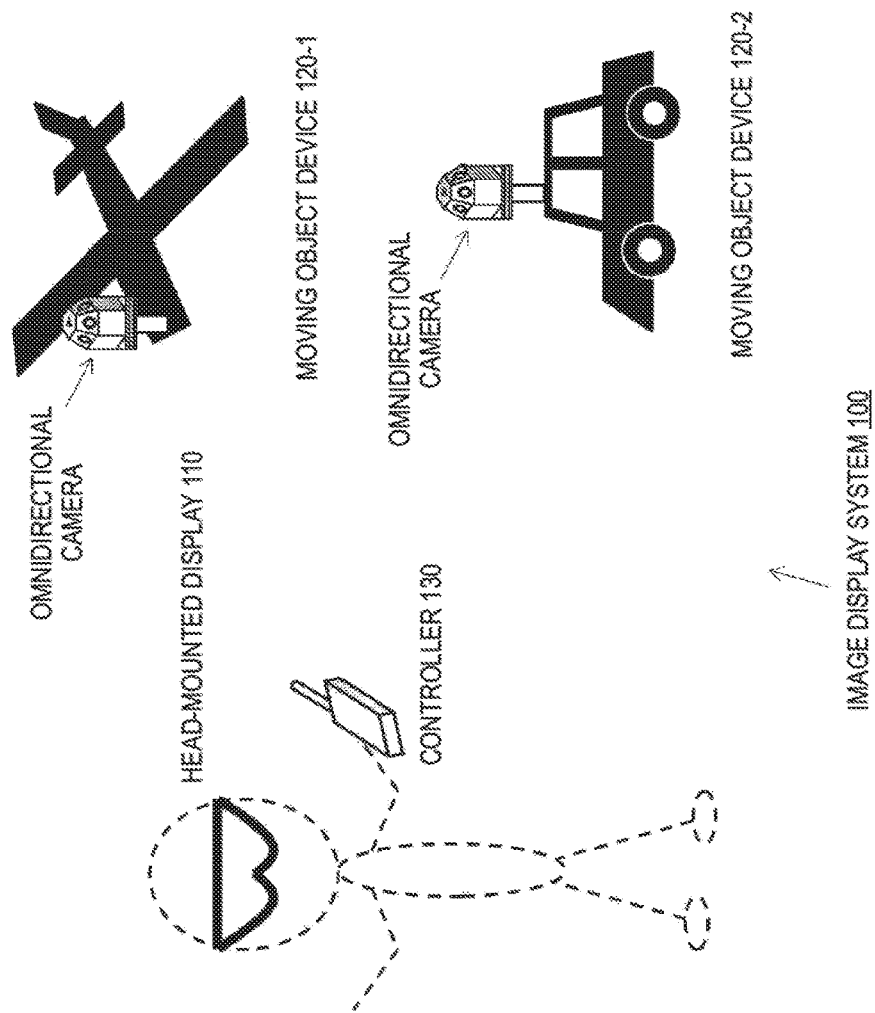
FIG. 1 is a diagram illustrating schematically a configuration of an image display system 100 according to an embodiment of the technology disclosed herein.

FIG. 1 illustrates schematically a configuration of an image display system 100 according to an embodiment of the technology disclosed herein. The illustrated image display system 100 is configured to include an image display device 110 (head-mounted display) used while being mounted on the head or face of a user and moving object devices 120-1, 120-2, . . . such as aircraft (or, a helicopter and other flying objects), motor vehicle, and watercraft. Some of the moving object devices 120 may be a radio-controlled device that is operated remotely by radio, and the user can pilot the radio-controlled device using a controller 130. Each of the moving object devices 120-1, 120-2, 120-3, . . . is equipped with an omnidirectional camera and captures a landscape during movement. The controller 130 may be, in one example, a multi-functional information terminal such as smartphones and tablets, and launches an application for piloting the moving object device 120.

Wireless connection is established between the head-mounted display 110 and the moving object device 120 and between the controller 130 and the moving object device 120, in one example, through wireless network, infrared communication, or the like. An image captured by the omnidirectional camera can be transmitted to other devices including the head-mounted display 110 by using a wireless communication function of the moving object device 120. However, for simplicity of description, the omnidirectional camera is herein assumed to be provided with its own wireless communication function.

Figure 2:
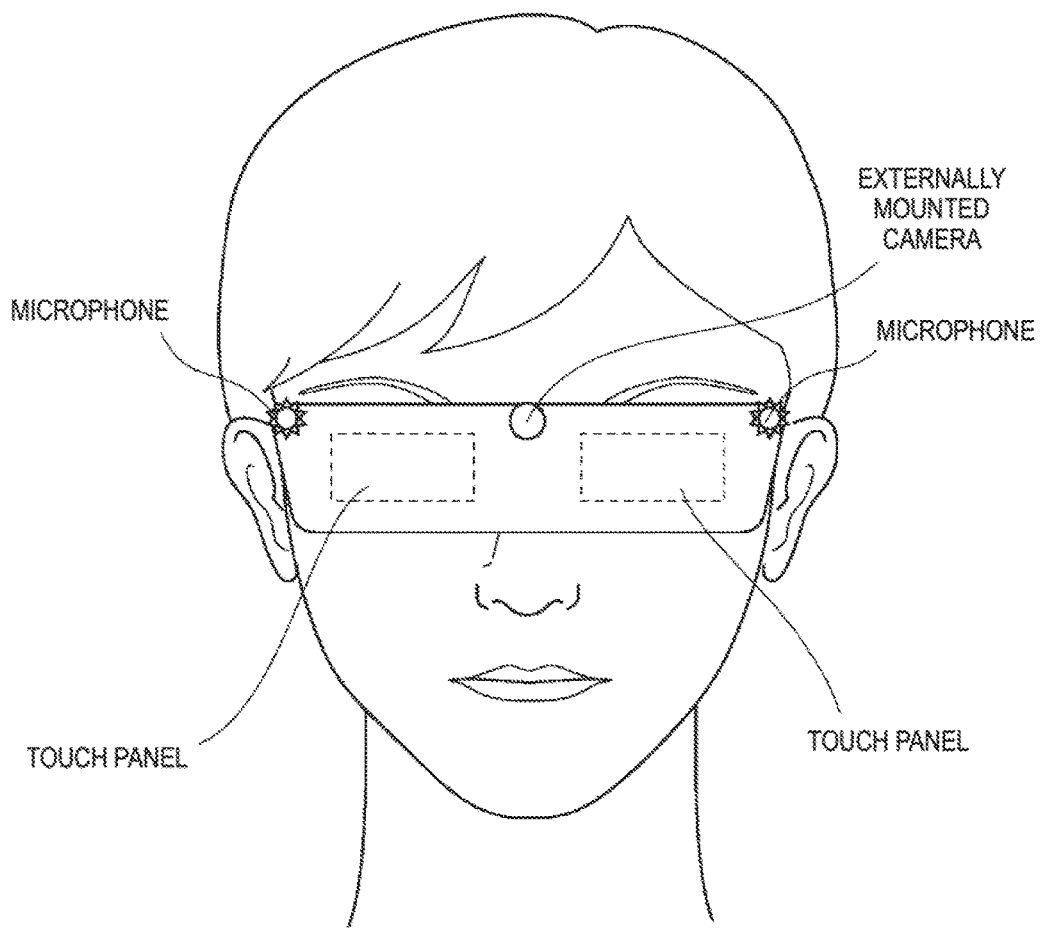
FIG. 2 is a diagram illustrating a user, as viewed from the front, who wears a head-mounted display 110 on the head, which is applied to the image display system illustrated in FIG. 1.

FIG. 2 illustrates a user, as viewed from the front, who wears the head-mounted display 110 on the head, which is applied to the image display system illustrated in FIG. 1.

The head-mounted display 110, when being worn on the head or face of a user, covers directly the user's eyes, thereby providing a sense of immersion for the user who is viewing an image. Furthermore, a displayed image is invisible to the outside (other people), and thus protection of privacy can be easily achieved in displaying information. It is different from a see-through type, and the user who wears the head-mounted display 110 is unable to view the real-world landscape. If it is equipped with an externally mounted camera (not shown) for capturing a landscape in the user's line-of-sight direction, the captured image is displayed on the head-mounted display 110, and thus the user is able to view indirectly the real-world landscape (i.e., the landscape is displayed using video see-through visualization).

The head-mounted display 110 illustrated in FIG. 2 is a structure similar to a helmet shape, and is configured to cover directly the left and right eyes of the user wearing it. The head-mounted display 110 has a display panel (not shown in FIG. 2) that is arranged in the position that faces the left and right eyes on the inner side of a main body of the head-mounted display 110. The user observes the display panel. The display panel is composed, in one example, of a micro-display such as organic electro-luminescence (EL) device and liquid crystal display or a laser scanning display such as retinal direct projection display.

The head-mounted display 110 has a microphone that is installed near both left and right ends of the main body of the head-mounted display 110. These microphones are located nearly symmetrically on both sides and allow only voice localized at the center (user's voice) to be recognized and to be separated from the surrounding noise or other people's voice, thereby preventing malfunction in operating it by inputting the voice.

Furthermore, the head-mounted display 110 has a touch panel that is arranged on the outside of the head-mounted display 110. The touch panel allows the user to perform a touch input with the fingertip or the like. Although a pair of left and right side touch panels are provided in the illustrated example, a single or three or more touch panels may be provided.

Figure 3:
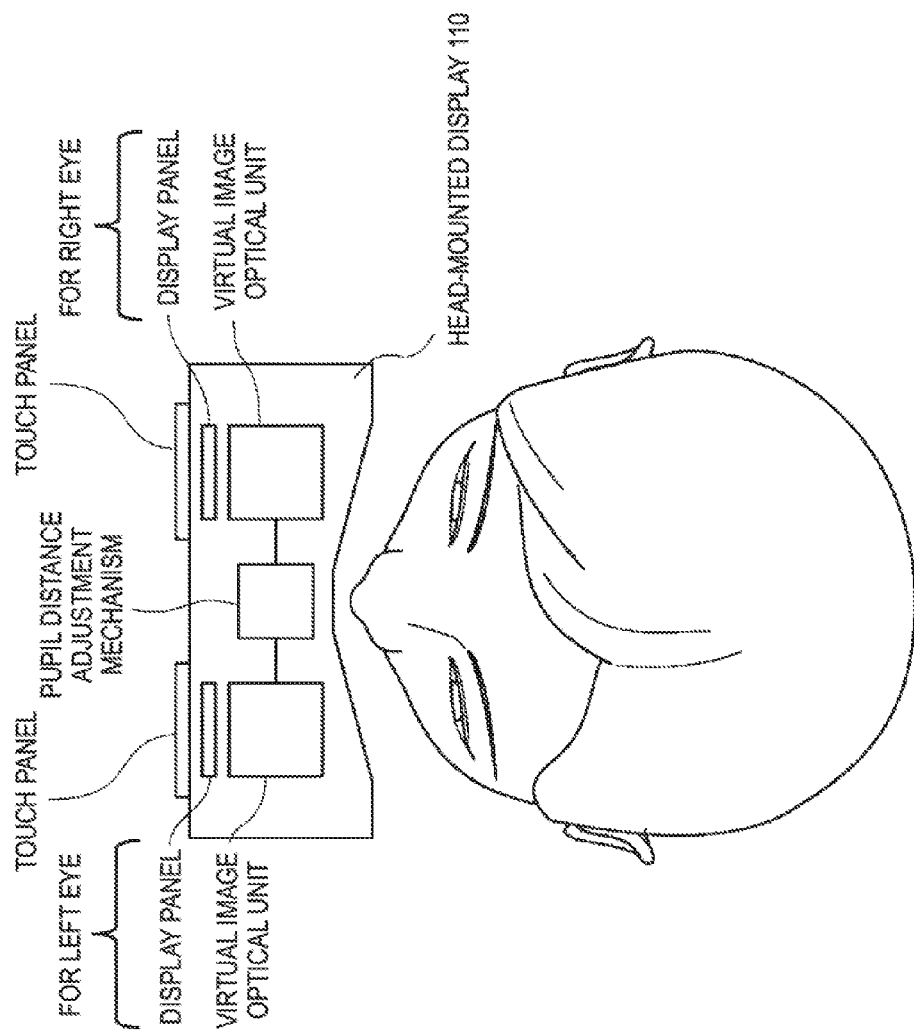
FIG. 3 is a diagram illustrating a user, as viewed from the above, who wears the head-mounted display 110 illustrated in FIG. 2.

FIG. 3 illustrates a user, as viewed from the above, who wears the head-mounted display 110 illustrated in FIG. 2. The illustrated head-mounted display 110 has the display panels for the left and right eyes on either side that faces the user's face. The display panel is composed, in one example, of a micro-display such as organic EL device and liquid crystal display or a laser scanning display such as retinal direct projection display. An image to be displayed on the display panel is observed, as an enlarged virtual image obtained by passing through a virtual image optical unit, by each of the left and right eyes of the user. Furthermore, each user has individual difference in height of eyes and pupil distance, and thus the eyes of the user wearing it is necessary to be aligned with left and right display systems. In the example illustrated in FIG. 3, a pupil distance adjustment mechanism is provided between the display panel for the right eye and the display panel for the left eye.

Figure 4:
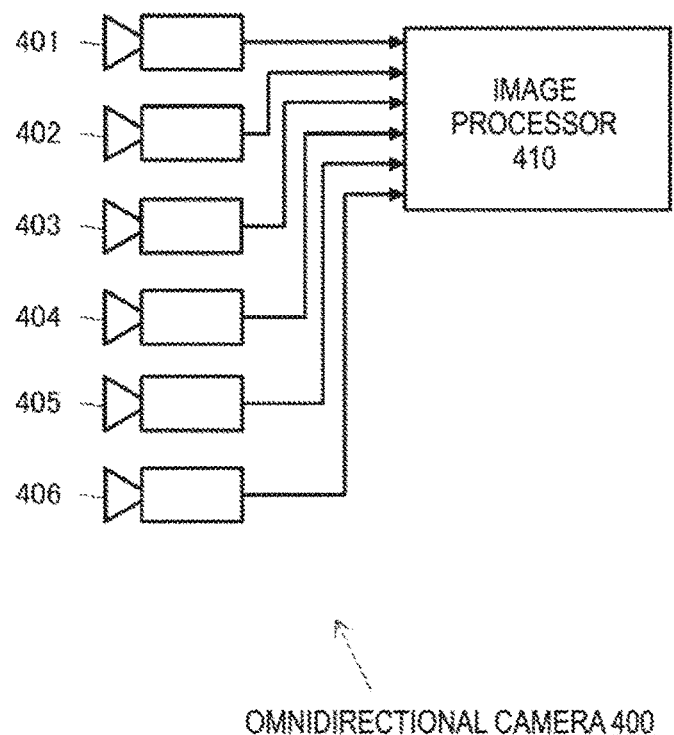
FIG. 4 is a diagram illustrating an exemplary configuration of an omnidirectional camera 400.
Figure 5:
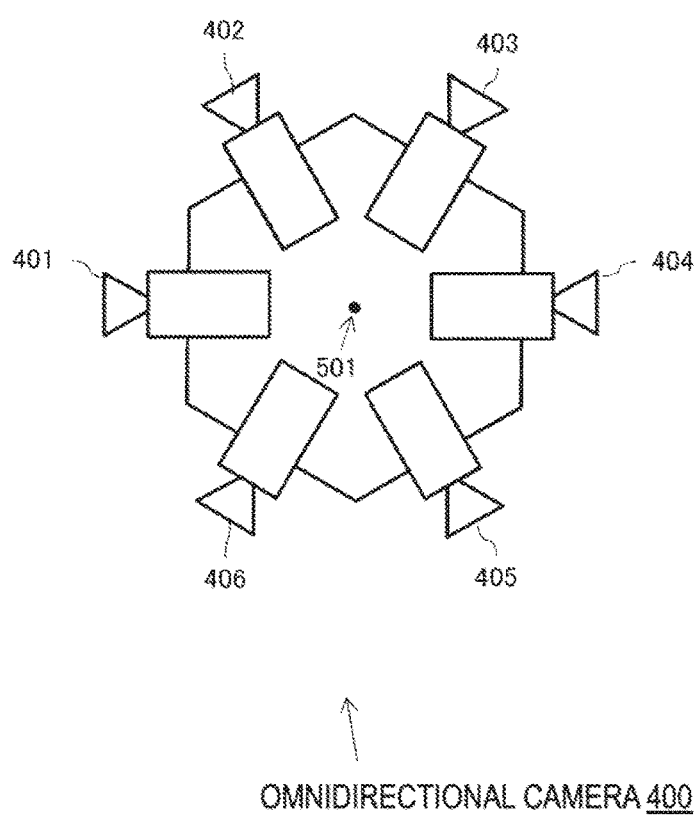
FIG. 5 is a diagram illustrating an exemplary configuration of the omnidirectional camera 400.
Figure 6:
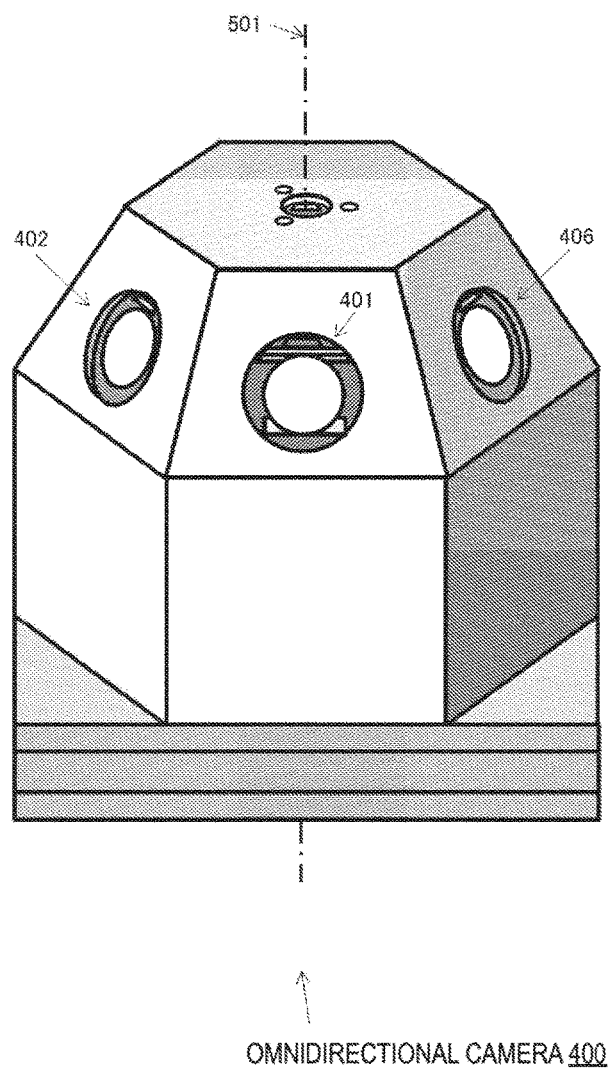
FIG. 6 is a diagram illustrating an exemplary configuration of the omnidirectional camera 400.

The omnidirectional camera to be mounted on the moving object device 120 can be configured with a combination of a plurality of video cameras, in one example. FIGS. 4 to 6 illustrate an exemplary configuration of an omnidirectional camera 400 including six video cameras.

The six video cameras 401, 402, ..., 406 are fixed at their respective predetermined positions and output a captured image to an image processor 410 in synchronization with it. Each of the video cameras 401, 402, ..., 406 employs a complementary metal-oxide-semiconductor (CMOS) image sensor as their respective image sensors, in one example.

The image processor 410 generates one omnidirectional image frame (or wide-angle image frame) by stitching images captured by the video cameras 401, 402, ..., 406 depending on relationship between positions at which the video cameras are located. Some or all of the generated omnidirectional images are transmitted wirelessly to the head-mounted display 110, and are provided as a free viewpoint image in which the viewpoint is shifted depending on the posture (line-of-sight direction) of the head of the user wearing it.

FIGS. 5 and 6 illustrate schematically an exemplary arrangement of the six video cameras 401, 402, ..., 406. FIG. 5 is a view looking down from the above, and FIG. 6 is a perspective view looking from the side. As illustrated, the six video cameras 401, 402, ..., 406 are radially arranged in back-to-back relation to each other in the direction of their respective main axes.

More preferably, the positions of the viewpoint (position of the camera) of the video cameras 401, 402, ..., 406 are arranged at predetermined angular intervals on a horizontal concentric circle centered on a vertical reference axis 501 (refer to FIGS. 5 and 6) passing through a predetermined reference point (described later). In the present embodiment, the six video cameras 401, 402, ..., 406 are arranged at 60 degree intervals. Furthermore, the video cameras 401, 402, ..., 406 are arranged so that both end portions of an image capturing viewing angle overlap between adjacent ones, thereby capturing the entire circumference without discontinuity in the horizontal direction.

Moreover, a specific exemplary configuration of the omnidirectional camera that is applicable to the image display system 100 according to the present embodiment will be found, in one example, in the specification of Patent Application No. 2014-128020 that has been assigned to the present applicant. The technology disclosed herein is not limited to the configuration of a particular omnidirectional camera.

Figure 7:
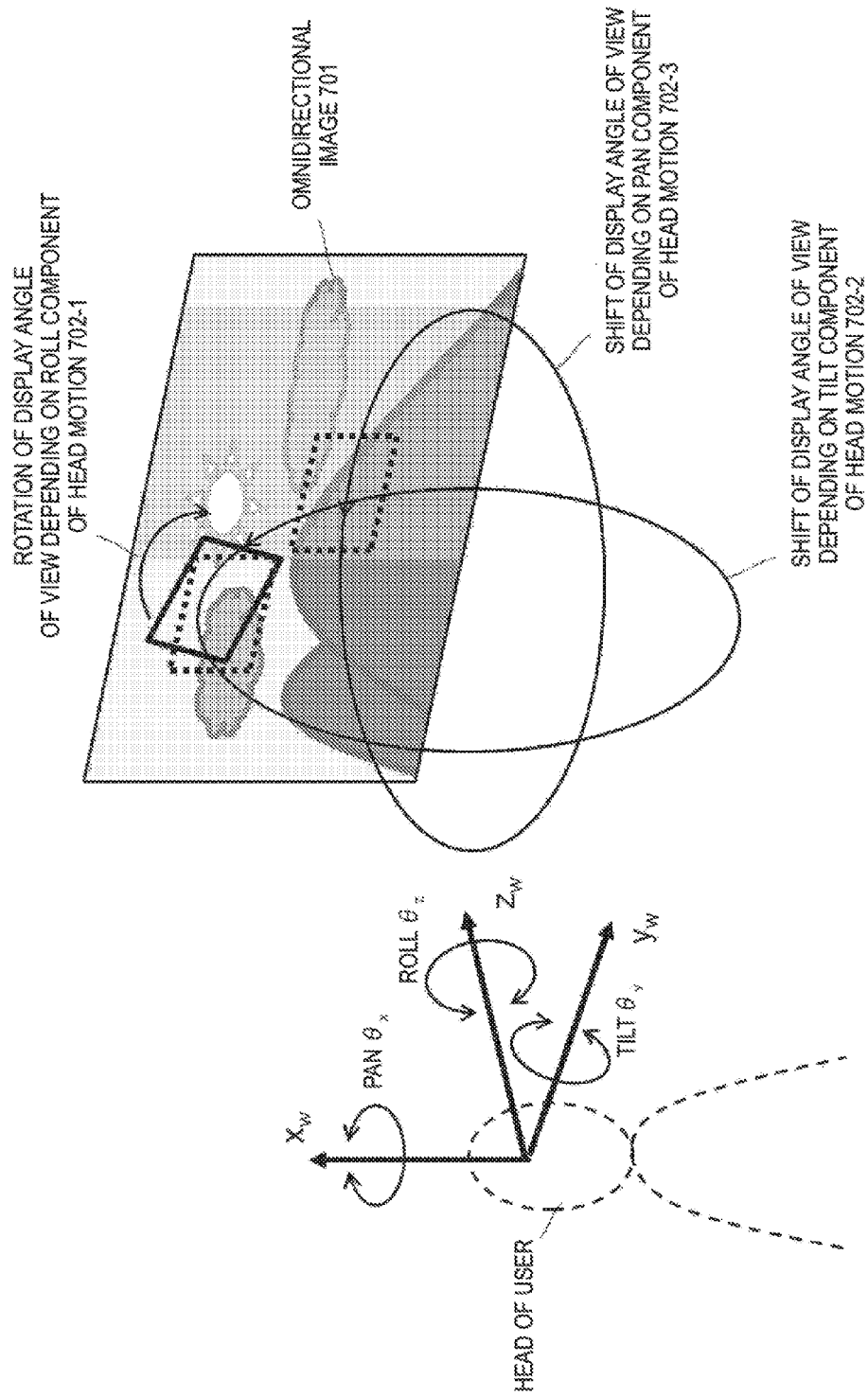
FIG. 7 is a diagram illustrated to describe how a user wearing the head-mounted display 110 views a free viewpoint image.

FIG. 7 illustrates how a user wearing the head-mounted display 110 views a free viewpoint image in the image display system 100 according to the present embodiment (i.e. how to display an image that tracks the movement of the user's head).

In the user's viewpoint, the depth direction is defined as $z_w$ axis, the horizontal direction is defined as $y_w$, the vertical direction is defined as $x_w$, and the origin positions of the user's reference axes $x_w$, $y_w$, and $z_w$ are defined as a user's viewpoint position. Thus, roll $\theta_z$ corresponds to motion around the $z_w$ axis of the user's head, tilt $\theta_y$ corresponds to motion around the $y_w$ axis of the user's head, and pan $\theta_z$ corresponds to motion around the $x_w$ axis of the user's head.

In the beginning, a movement in the direction of each of roll, tilt, and pan of the user's head ($\theta_z$, $\theta_y$, $\theta_z$) or posture information composed of translation of the head are detected. Then, the center of a region 702 to be clipped is shifted from an original omnidirectional image 701 captured by an omnidirectional camera to track the posture of the user's head, and an image of the region 702 clipped by a predetermined angle of view at its center position is rendered. More specifically, a display region is shifted to cancel a movement of the user's head by rotating a region 702-1 depending on the roll component of the user's head motion, by rotating a region 702-2 depending on the tilt component of the user's head motion, or by rotating a region 702-3 depending on the pan component of the user's head motion. This makes it possible for the head-mounted display 110 to present a free viewpoint image that tracks the user's head movement.

Moreover, an example of a process of rendering a free viewpoint image depending on the user's head posture from an omnidirectional image captured by an omnidirectional camera includes a method of performing it in the omnidirectional camera, a method of transmitting an omnidirectional image to the head-mounted display 110 and performing it in the head-mounted display 110, and a method of uploading an omnidirectional image to a cloud computer and performing it on a cloud.

In this regard, as illustrated in FIG. 1, in a case where the omnidirectional camera is mounted on the moving object device 120, it is envisaged that the moving object device 120 changes its course. With a change in the courses of the moving object device 120, the posture of the omnidirectional camera varies. Thus, even when the user wearing the head-mounted display 110 is not intended to move his head, an image to be viewed will vary disadvantageously. If the user views an unintended image that does not match the user's movement, the user will suffer health hazard such as virtual reality (VR) sickness.

Thus, in the present embodiment, the head posture of the user who wears the head-mounted display 110 is corrected depending on a variation in posture of the omnidirectional camera to perform clipping of a displayed image from the omnidirectional image. Such a process makes it possible for a free viewpoint image at the same place to remain visible as long as the user does not move, thereby preventing VR sickness.

Figure 8:
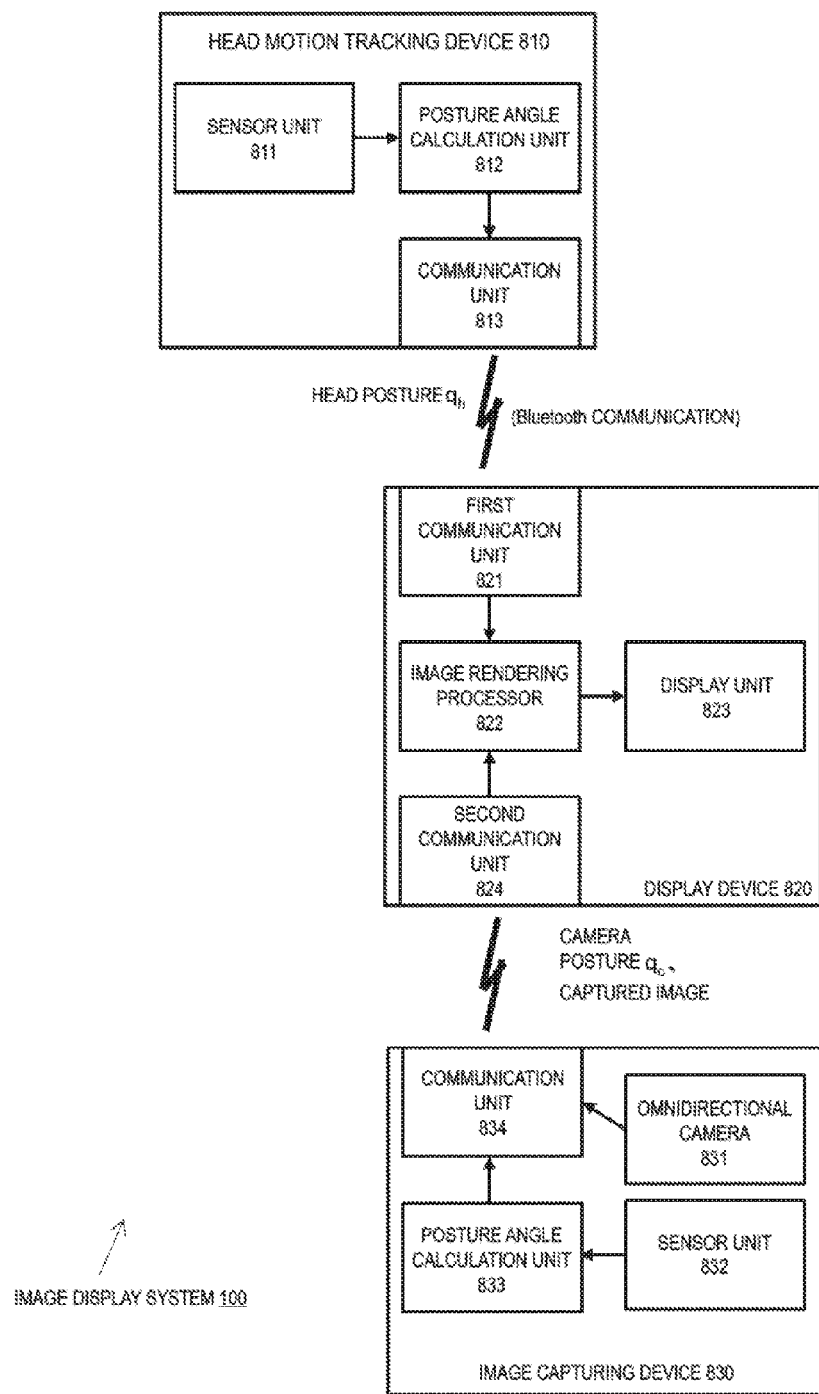
FIG. 8 is a diagram illustrating an exemplary functional configuration of the image display system 100.

FIG. 8 illustrates an exemplary functional configuration of the image display system 100 in which the image clipping process as described above can be implemented. The illustrated image display system 100 is configured to include three devices, that is, a head motion tracking device 810, a display device 820, and image capturing device 830.

The head motion tracking device 810 is used while being mounted on the head of the user who observes an image displayed on the display device 820, and outputs information on the user's head posture to the display device 820 at predetermined transmission intervals. In the illustrated example, the head motion tracking device 810 is configured to include a sensor unit 811, a posture angle calculation unit 812, and a communication unit 813.

The sensor unit 811 is configured with a combination of a plurality of sensor devices such as gyro sensor, acceleration sensor, and geomagnetic sensor, in one example, and is configured to detect a posture angle of the user's head. In this description, it is assumed to be a sensor that is capable of detecting a total of nine axes of three-axis gyro sensor, three-axis acceleration sensor, and three-axis geomagnetic sensor.

Figure 9:
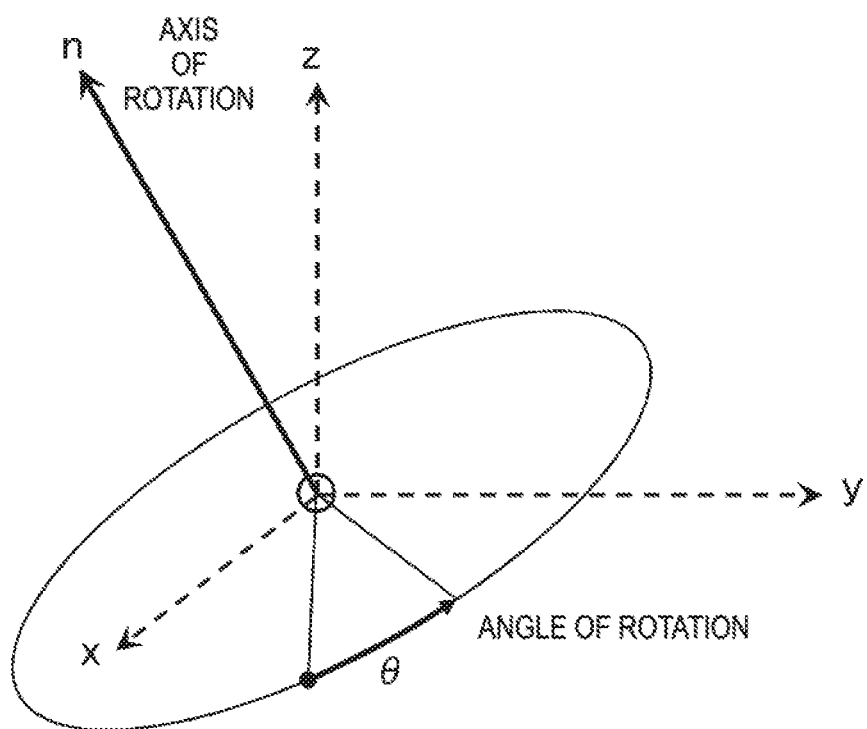
FIG. 9 is a diagram illustrating an example of a quaternion.

The posture angle calculation unit 812 calculates information on the user's head posture based on a result obtained by detection of nine axes by the sensor unit 811. In the present embodiment, the posture angle is assumed to be represented as a quaternion. Furthermore, in the following description, a three-dimensional vector indicating a position is defined as p, and a quaternion indicating a posture is defined as q. The quaternion q is a quaternion that consists of an axis of rotation (vector) and an angle of rotation (scalar), as shown in the following formula (1) and FIG. 9. The quaternion is suitable for computation because of no singularity. In the field of computer graphics, an object's posture is typically represented using a quaternion.

[Math. 1]

$$q = s + ix + jy + kz \\ = (s, x, y, z) \\ = (\cos(\theta/2), n\sin(\theta/2))$$

(1)

The head motion tracking device 810 and the display device 820 are assumed to be interconnected by wireless communication such as Bluetooth (registered trademark) communication. Alternatively, the connection between the head motion tracking device 810 and the display device 820 may be established via high-speed wired interface such as universal serial bus (USB) instead of wireless communication. The information on the user's head posture obtained by the posture angle calculation unit 812 is transmitted to the display device 820 via the communication unit 813.

The image capturing device 830 is configured to include an omnidirectional camera 831, a sensor unit 832, a posture angle calculation unit 833, and a communication unit 834. In the present embodiment, the image capturing device 830 is used while being mounted on the moving object device 120.

The omnidirectional camera 831 is configured as illustrated in FIGS. 4 and 8, and captures an omnidirectional image. A detailed description thereof will be omitted.

The sensor unit 832 is configured with a combination of a plurality of sensor devices such as gyro sensor, acceleration sensor, and geomagnetic sensor, in one example. In this description, it is assumed to be a sensor that is capable of detecting a total of nine axes of three-axis gyro sensor, three-axis acceleration sensor, and three-axis geomagnetic sensor. The posture angle calculation unit 833 calculates information on posture of the omnidirectional camera 831 based on a result obtained by detection of nine axes by the sensor unit 832. In the present embodiment, a posture angle is assumed to be represented as a quaternion (same as the above).

The image capturing device 830 and the display device 820 are assumed to be interconnected by wireless communication such as wireless fidelity (Wi-Fi). The information on the image captured by the omnidirectional camera 831 and the information on the posture of the omnidirectional camera 831 obtained by the posture angle calculation unit 833 are transmitted to the display device 820 via the communication unit 834.

The display device 820 is equivalent to the head-mounted display 110 in the image display system 100 illustrated in FIG. 1. In the example illustrated in FIG. 8, the head motion tracking device 810 is configured as a separate device from the display device 820 (in one example, the head motion tracking device 810 is manufactured and sold as an optional product of the head-mounted display 110). Alternatively, the head motion tracking device 810 and the display device 820 can be integrated into one head-mounted display 110.

The display device 820 is configured to include a first communication unit 821, a second communication unit 824, an image rendering processor 822, and a display unit 823.

In a case where the display device 820 is configured as a head-mounted display, the display unit 823 is provided with left and right screens that are respectively fixed to the user's left and right eyes, in one example, and displays an image for the left eye and an image for the right eye. The screen of the display unit 823 is composed, in one example, of a display panel including a micro-display such as organic EL device and liquid crystal display or of a laser scanning display such as retinal direct projection display. Furthermore, a virtual image optical unit (not illustrated), which enlarges an image displayed on the display unit 823, projects it, and focuses an enlarged virtual image having a predetermined angle of view on the user's pupil, is provided.

The first communication unit 821 receives the information on the user's head posture from the head motion tracking device 810 via the communication unit 813. Furthermore, the second communication unit 824 receives the information on the image captured by the omnidirectional camera 831 from the image capturing device 830 via the communication unit 834 and the information on the posture of the omnidirectional camera 831 obtained by the posture angle calculation unit 833. Moreover, in the present embodiment, the posture angle calculation unit 812 is equipped in the head motion tracking device 810 and the posture angle calculation unit 833 is equipped in the image capturing device. However, it is possible to have a configuration in which the communication units 813 and 834 transmit wirelessly results detected by the sensor units 811 and 832, respectively, without any modification, instead of transmitting their respective posture information items, thereby preventing the devices 810 and 830 from performing the posture angle calculation, and the display device 820 performs their respective posture angle calculation processes using sensor-based information received by the first communication unit 821 or the second communication unit 824.

The image rendering processor 822 renders an image obtained by clipping a display angle of view corresponding to the information on the user's head posture from the omnidirectional image. The shift of a display angle of view obtained by clipping an original image to cancel a posture angle of the user's head makes it possible for the display unit 823 to display an image that tracks the head's movement. Thus, it is possible for the user to experience viewing a large screen.

Furthermore, in the present embodiment, the image rendering processor 822 corrects the head posture of the user (user wearing the head-mounted display 110) who observes an image displayed on the display device 820 depending on the variation in posture of the omnidirectional camera 831, thereby performing clipping of an omnidirectional image. Such a correction process allows a free viewpoint image at the same place to remain visible as long as the user does not move, even when the posture of the camera 831 varies.

Figure 10:
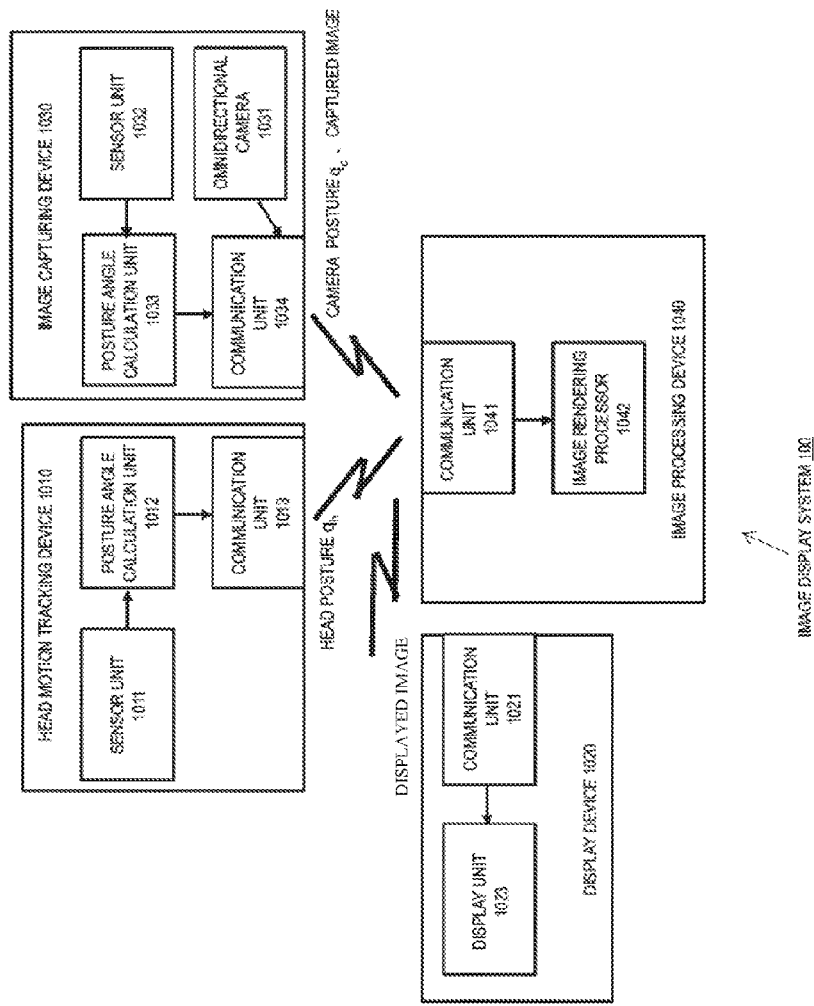
FIG. 10 is a diagram illustrating another exemplary functional configuration of the image display system 100.

FIG. 10 illustrates another exemplary functional configuration of the image display system 100. The illustrated image display system 100 is configured to include four devices, that is, a head motion tracking device 1010, a display device 1020, an image capturing device 1030, and an image processing device 1040.

The head motion tracking device 1010 is used while being mounted on the head of the user who observes an image displayed on the display device 1020, and outputs information on the user's head posture to the image processing device 1040 at predetermined transmission intervals. In the illustrated example, the head motion tracking device 1010 is configured to include a sensor unit 1011, a posture angle calculation unit 1012, and a communication unit 1013.

The sensor unit 1011 is a sensor capable of detecting nine axes (same at the above) and detects a posture angle of the user's head. The posture angle calculation unit 1012 calculates a quaternion $q_h$ indicating a posture angle of the user's head based on a result obtained by detection of nine axes by the sensor unit 1011. Then, the calculated quaternion $q_h$ is transmitted to the image processing device 1040 via the communication unit 1013.

The image capturing device 1030 is configured to include an omnidirectional camera 1301, a sensor unit 1302, a posture angle calculation unit 1033, and a communication unit 1034. The image capturing device 1030 is used while being mounted on the moving object device 120 (same as the above).

The omnidirectional camera 1031 is configured as illustrated in FIGS. 4 to 6, and captures an omnidirectional image. The sensor unit 1032 is a sensor capable of detecting nine axes (same as the above), and detects a posture angle of the omnidirectional camera 1301. The posture angle calculation unit 1033 calculates a quaternion $q_c$ indicating the posture angle of the omnidirectional camera 1031 based on a result obtained by detection of nine axes by the sensor unit 1032. Then, the calculated quaternion $q_c$ is transmitted to the image processing device 1040 via the communication unit 1034.

The image processing device 1040 is composed of a cloud computer, in one example. The image processing device 1040 receives the quaternion $q_h$ indicating a posture angle of the user's head from the head motion tracking device 1010 via the communication unit 1041, and receives information on an image captured by the omnidirectional camera 1031 and the quaternion $q_c$ indicating the posture angle of the omnidirectional camera 1031 from the image capturing device 1030. Then, the image rendering processor 1042 renders the image obtained by clipping the display angle of view corresponding to the information on the user's head posture from the omnidirectional image and transmits it to the display device 1020 via the communication unit 1041. Furthermore, as with the configuration described above, it is possible to have a configuration in which the head motion tracking device 1010 or the image capturing device 1030 does not perform the posture angle calculation but transmits the sensor-based information to the image processing device 1040 for allowing the posture angle calculation to be performed by the image processing device 1040.

The display device 1020 displays the image information, which is received from the image processing device 1040 via the communication unit 1021, on the display unit 1023. The display device 1020 shifts the display angle of view in the original image to cancel the posture angle of the user's head, and thus the display unit 1023 can display an image that tracks the head's movement. Thus, it is possible for the user to experience viewing a large screen. The image processing device 1040 is composed, in one example, of a cloud computer, and in the case where it is configured to be connected to the display device 1020 via a communication unit, a transmission delay in the communication unit may become a problem. In a modified example of the system configuration illustrated in FIG. 10, the display device 1020 is provided with a second image rendering processor (not illustrated) and the image processing device 1040 transmits not only information on the clipped image but also information on the user's head posture used in clipping simultaneously, and thus the display device 1020 can adjust the position at which the image is displayed using the posture information received from the image processing device 1040 and posture information that is newly received from the head motion tracking device 1010, thereby alleviating the transmission delay problem.

Figure 11:
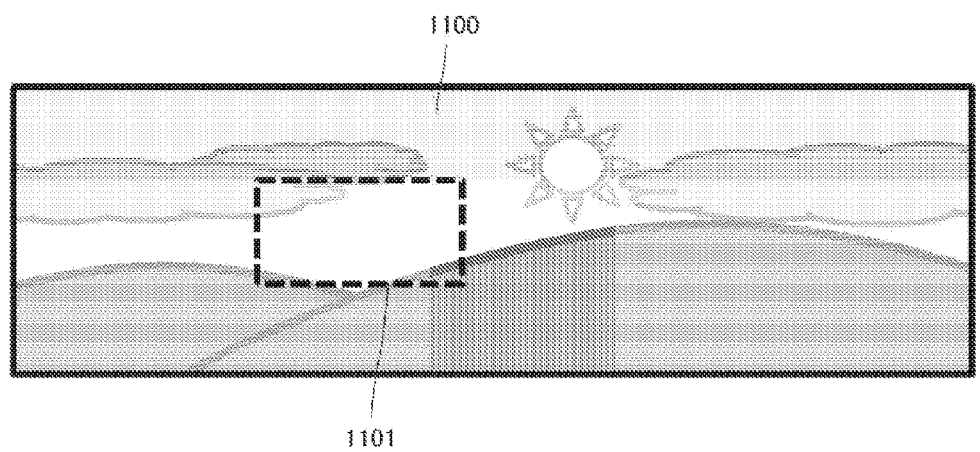
FIG. 11 is a diagram illustrating how to clip a display angle of view from an omnidirectional image depending on a user's head posture.

FIG. 11 illustrates how to clip a display angle of view 1101 corresponding to the head posture of the user who wears the head-mounted display 110 from an omnidirectional image 1100 captured by an omnidirectional camera mounted on the moving object device 120.

Figure 12:
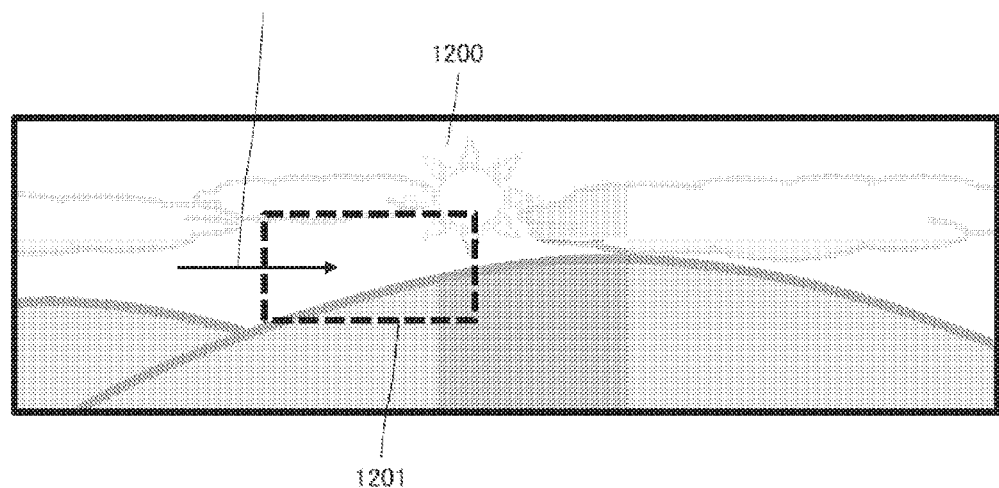
FIG. 12 is a diagram illustrating how to clip a display angle of view that does not match a user's head posture due to a change in posture of the omnidirectional camera.

Furthermore, FIG. 12 illustrates how the posture of the moving object device 120, that is, the omnidirectional camera is changed in a leftward direction even though the user does not move his head posture, and accordingly, a display angle of view 1201 obtained by clipping from an omnidirectional image 1200 moves in a rightward direction. In this case, even though the user wearing the head-mounted display 110 does not move his head, a phenomenon occurs in which an image being viewed varies. If an unintended image that does not match the user's movement is viewed, the user will suffer health hazard such as virtual reality (VR) sickness.

In one example, in the case where the user operates remotely the moving object device 120 using the controller 130 while the user views an image captured by a camera mounted on the moving object device 120, if the moving object device 120 performs a motion against the user's intention or an unintended motion, the user is likely to experience VR sickness. Even if the moving object device 120 moves according to the remote operation by the user, a vigorous movement of a displayed image is more likely to cause VR sickness.

In order to prevent the VR sickness as described above, there may be conceived a solution that causes a low-pass filter to cut it by improving the control performance of the moving object device 120 by the controller 130 so that motion against the user's intention is prevented from occurring, that is, the moving object device 120 performs only slow-speed motion, or alternatively so that fast-speed motion of a camera is prevented from being displayed on the head-mounted display 110.

Meanwhile, in the technology disclosed herein, an image captured by a camera mounted on the moving object device 120 is displayed by clipping a portion suitable for the direction viewed by the user wearing the head-mounted display 110 from an omnidirectional image, rather than being displayed without any modification.

Figure 13:
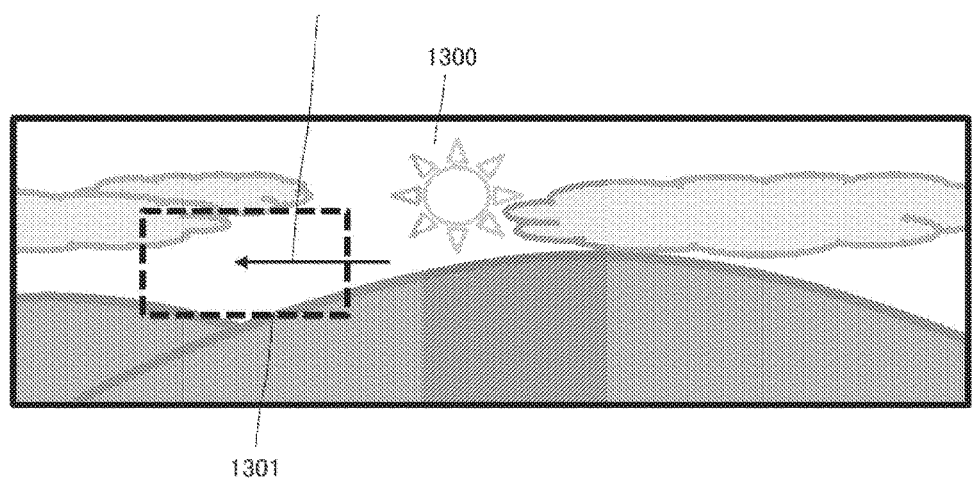
FIG. 13 is a diagram illustrating how to clip a display angle of view obtained by correcting a user's head posture depending on a variation in posture of an omnidirectional camera.

In one example, in the embodiment illustrated in FIGS. 8 and 10, the user's head posture measured by the head motion tracking device 810 or 1010 is corrected depending on a variation in the posture of the omnidirectional camera 830 or 1030. FIG. 13 illustrates how to clip a display angle of view 1301 obtained by correcting a user's head posture depending on a variation in posture of an omnidirectional camera from an omnidirectional image 1300 captured by an omnidirectional camera whose posture is changed in a leftward direction. Such a process makes it possible for the same free viewpoint image to remain visible as long as the user does not move even if the posture of the omnidirectional camera is changed, thereby preventing VR sickness.

In clipping a display angle of view suitable for the direction being viewed by the user from an omnidirectional image (or a wide-angle image), rather than using a coordinate system fixed to a camera and a coordinate system fixed to the user's body, a third coordinate system is used. In other words, the camera side and the head-mounted display side perform independently estimation of the position and posture variation, and a region of the image to be displayed is determined based on a result obtained from both sides.

Figure 14:
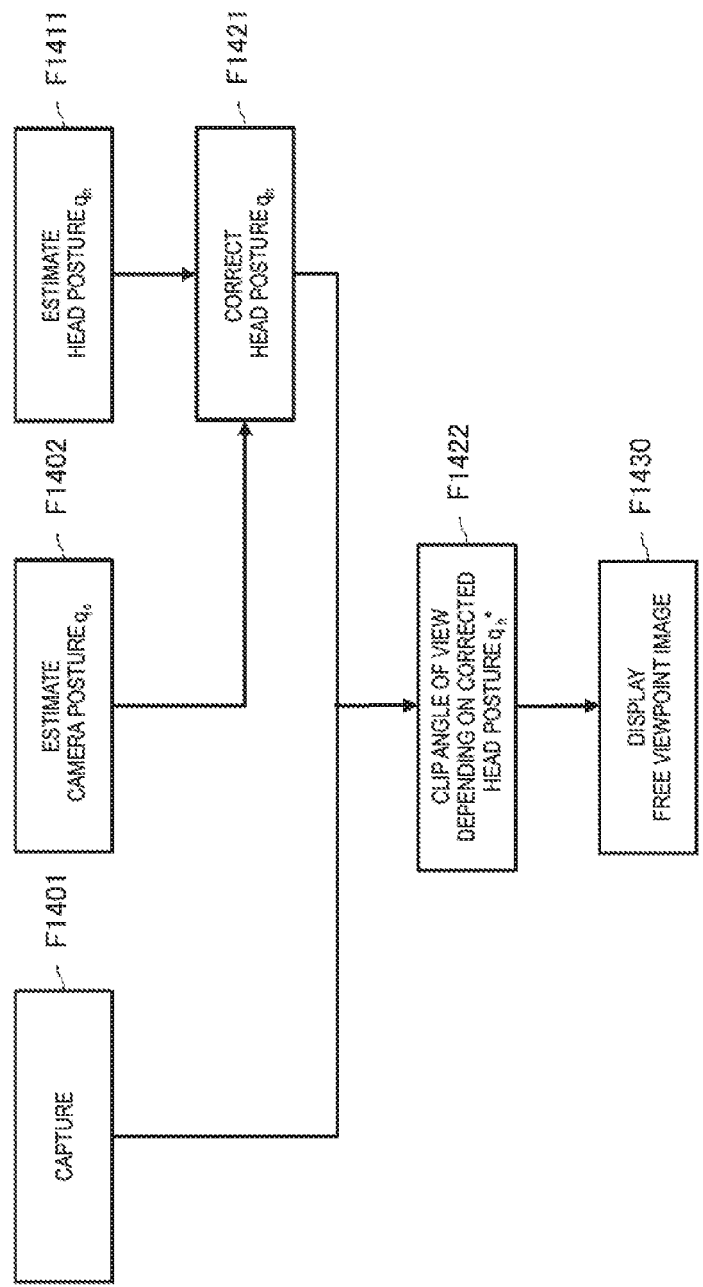
FIG. 14 is a diagram illustrating a processing procedure for clipping a free viewpoint image from an omnidirectional image at a display angle of view obtained by correcting a user's head posture depending on a variation in posture of an omnidirectional camera.

FIG. 14 illustrates a processing procedure for clipping a free viewpoint image from an omnidirectional image at a display angle of view obtained by correcting a head posture of the user wearing the head-mounted display 110 depending on a variation in posture of an omnidirectional camera. In one example, this processing procedure is performed by the image rendering processor 822 included in the display device 820 in the image display system 100 illustrated in FIG. 8, or is performed by the image processing device 1040 in the image display system 100 illustrated in FIG. 10. In the following, for convenience' sake, the description will be given on the assumption that the process is performed in the image display system 100 illustrated in FIG. 10.

The omnidirectional camera 1031 of the image capturing device 1030 mounted on the moving object device 120 captures an omnidirectional image (F1401). Furthermore, the sensor unit 1032 detects a posture angle of the omnidirectional camera 1031, and the posture angle calculation unit 1033 calculates a quaternion $q_c$ indicating a posture angle of the omnidirectional camera 1031 based on a result obtained by detection of nine axes by the sensor unit 1032 (F1402).

Then, the captured image and the camera posture angle $q_c$ are transmitted to the image processing device 1040 via the communication unit 1034.

On the other hand, in the head motion tracking device 1010, the sensor unit 1011 detects a posture angle of the user's head, and the posture angle calculation unit 1012 calculates a quaternion $q_h$ indicating a posture angle of the user's head based on a result obtained by detection in the sensor unit 1011 (F1411). Then, the head posture angle $q_h$ is transmitted to the image processing device 1040 via the communication unit 1013.

In the image processing device 1040, the communication unit 1041 receives the captured image and the camera posture angle $q_c$ from the image capturing device 1030 and receives the user's head posture angle $q_h$ from the head motion tracking device 1010. In the case where the camera posture angle $q_c$ is not changed, the image rendering processor 1042 may clip a display angle of view depending on the user's head posture angle $q_h$ from the captured image to render the free viewpoint image. However, in the present embodiment, it is envisaged that the camera posture angle $q_c$ varies as illustrated in FIG. 13. Thus, in the beginning, the image rendering processor 1042 corrects the user's head posture angle $q_h$ using the camera posture angle $q_c$ (F1421), and clips a display angle of view depending on the corrected user's head posture angle $q_h^*$ from the captured image to render a free viewpoint image (F1422). Then, the image processing device 1040 transmits the free viewpoint image rendered by the image rendering processor 1042 to the display device 1020 via the communication unit 1041, and the display device 1020 displays it (F1430).

Moreover, the process of correcting the corrected user's head posture angle $q_h$ in the above process F1422 is performed in accordance with the following formula (2). In other words, the corrected user's head posture angle $q_h^*$ is determined by multiplying the original user's head posture angle $q_h$ by a multiplicative inverse of the camera posture angle $q_c$ from the left hand. Moreover, each of the posture angles $q_h$ and $q_c$ is information on a posture angle of each of the head and the camera measured using the above-mentioned third coordinate system as a reference.

[Math. 2]

$$q_h^* = q_c^{-1} q_h \quad (2)$$

The image display system 100 in which an image capturing device provided with an omnidirectional camera is mounted on the moving object device 120 such as aircraft (or a helicopter and other flying objects), motor vehicle, and watercraft has been described above. Meanwhile, a video see-through image display system 100 in which an omnidirectional camera is attached to the user who wears the head-mounted display 110 illustrated in FIG. 15 and the user views a captured image through the head-mounted display 110 is also conceivable. In this case, a display angle of view depending on the user's head posture is clipped from an omnidirectional image captured by an omnidirectional camera and is displayed on the head-mounted display 110.

In such a video see-through image display system 100, the problem of discrepancy between the user's head posture and its display angle of view is caused by delay time from capturing by a camera to displaying as well as by a variation in the camera's posture as illustrated in FIG. 12. If the direction of the head does not match the display angle of view, the user will view an unintended image, and thus is more likely to cause VR sickness.

Furthermore, in a see-through head-mounted display as illustrated in FIG. 15, if the mounting position and posture of a camera and the position at which the user views a captured image (eye position) and posture of the user are in discrepancy, various problems occur as listed in the following items (1) to (3).

(1) Sense of distance is difficult to find as if the hand looks shorter (2) Virtual reality sickness is easily get unless optical axis direction is adjusted (3) Virtual reality sickness is easily get unless imaging viewing angle and display viewing angle match The present inventors have found that the problem of delay or discrepancy between posture and viewing angle in the video see-through image display system 100 can be reduced by a combination of display correction in consideration of camera posture and head motion tracking prediction.

For simplicity of description, a case where there is no delay time from capturing by a camera to displaying is considered. In this case, it is necessary only to align a reference coordinate system of a camera with a display optical system (screen of a display unit) and to match it with a viewing angle to be presented to the user.

Figure 16:
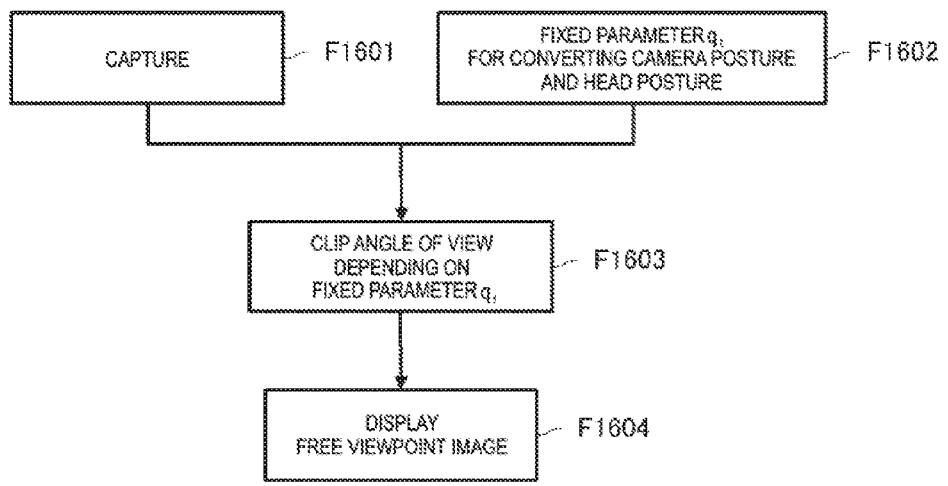
FIG. 16 is a diagram a processing procedure for displaying an image that matches a viewing angle of a user by aligning an image captured by a camera with a reference coordinate system of a display optical system.

FIG. 16 illustrates a processing procedure for displaying an image obtained by aligning an image captured by a camera with a reference coordinate system of a display optical system and matching it with a viewing angle of the user (in this case, it is assumed that there is no delay time from capturing to displaying).

The omnidirectional camera 1031 of the image capturing device 1030 attached to the user captures an omnidirectional image (F1601).

The position of the omnidirectional camera 1301 relative to the user (or the display device 1020 worn by the user) is assumed to be fixed. In this case, the user's head posture can be represented as a fixed parameter $q_t$ using the camera's posture as a reference. Thus, a display angle of view depending on the fixation may be clipped from the image captured by the camera (F1602 and F1603), and may be displayed (F1604). The camera and the head are moved together, and thus the corrected user's head posture angle $q_h'^* = q_c^{-1} q_h$ in the above formula (2) is typically kept at a constant value (independent of values of the posture angles $q_c$ and $q_h$), which is called as the fixed parameter $q_t$.

Figure 17:
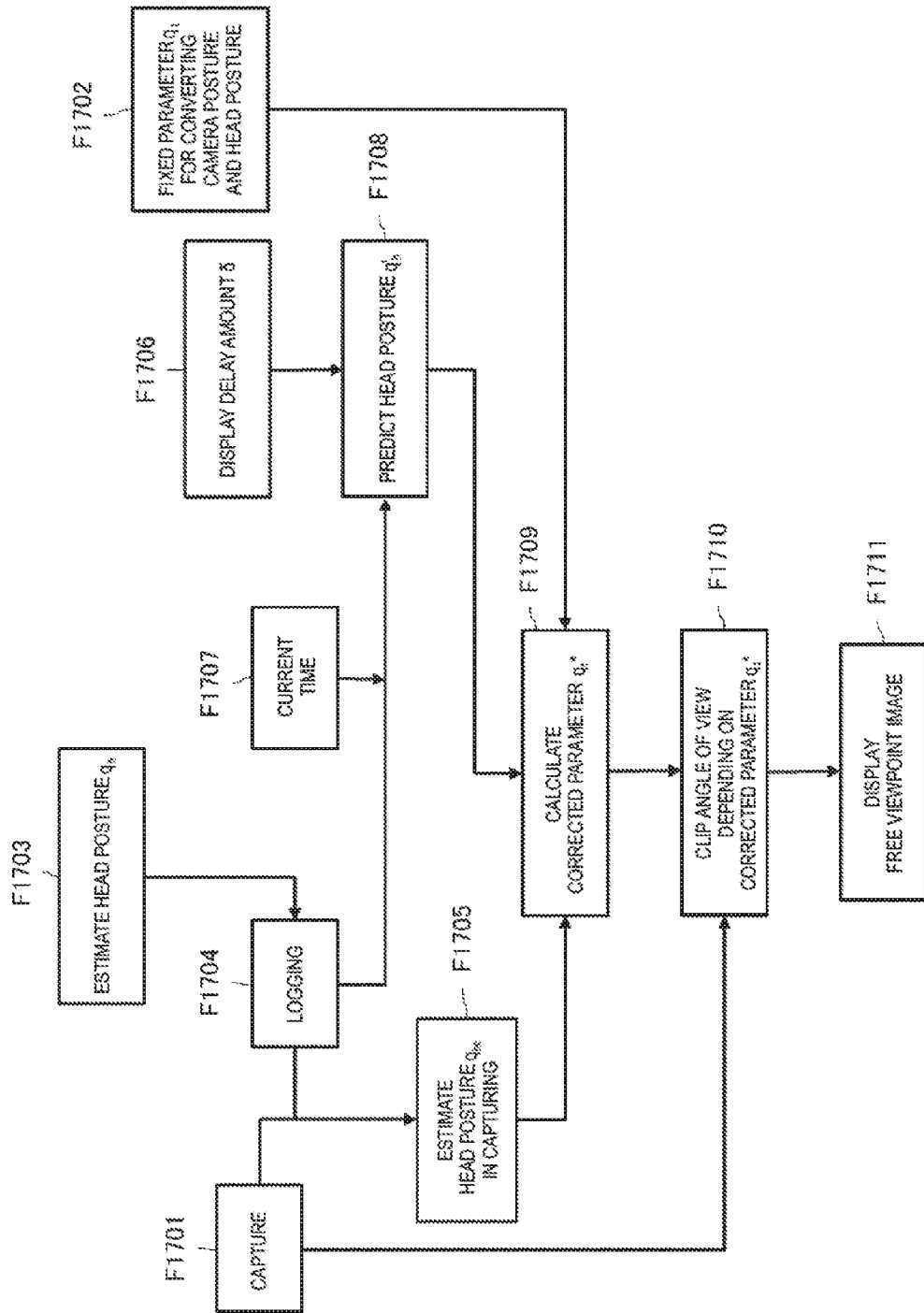
FIG. 17 is a diagram illustrating a processing procedure for displaying an image that matches a viewing angle of the user by aligning an image captured by a camera with a reference coordinate system of a display optical system in consideration of delay time between image capturing and displaying.

Furthermore, FIG. 17 illustrates a processing procedure for displaying an image obtained by aligning an image captured by a camera with a reference coordinate system of a display optical system and matching it with a viewing angle of the user in consideration of delay time from capturing to displaying.

The omnidirectional camera 1031 of the image capturing device 1030 attached to the user captures an omnidirectional image (F1701).

Furthermore, the relative positional relationship of the omnidirectional camera 1301 to the user (or the display device 1020 worn by the user) is fixed, and the fixed parameter $q_t$ for converting the camera's posture to the user's head posture is held (F1702). The fixed parameter $q_t$ is determined by mechanical arrangement of the display optical system and the camera capturing system.

Furthermore, in the head motion tracking device 1010, the sensor unit 1011 detects a posture angle of the user's head, and the posture angle calculation unit 1012 calculates a quaternion $q_h$ indicating a posture angle of the user's head based on a result obtained by detection in the sensor unit 1011 (F1703), which is logged in association with time information in acquiring the sensor-based information (F1704). Then, on the basis of the time at which capturing is performed in F1701 and the estimation value $q_h$ of the head posture logged in F1704, a head posture $q_{hc}$ in capturing is estimated (i.e., interpolation or prediction for the capturing time is performed) (F1705). Furthermore, delay time δ from the current time to displaying an image on the display optical system is approximated (F1706). On the basis of the current time (F1707) and the estimation value $q_h$ of the head posture logged in F1704, a head posture $q_h'$ at the time when the subsequent display is performed (current time+delay time δ) is predicted (F1708). Moreover, the delay time δ is determined mainly depending on a drive frequency of a display panel or the configuration of a panel drive circuit. The prediction of the head posture by considering the delay time δ can be performed, in one example, using the prediction algorithm disclosed in Patent Application No. 2013-268014, which is assigned to the present applicant.

In the image processing device 1040, on the basis of the fixed parameter $q_t$ acquired in F1702, the head posture $q_{hc}$ estimated in F1705, and the prediction value $q_h'$ of the head posture predicted in F1708, a corrected parameter $q_t^*$ is calculated (F1709). More specifically, as shown in the following formula (3), the corrected parameter $q_t^*$ is calculated by multiplying the fixed parameter $q_t$ by correction terms $q_{hc}^{-1}$ and $q_h'$, which are obtained by multiplying the prediction value $q_h'$ by a multiplicative inverse of the head posture $q_{hc}$ in capturing from the left of the prediction value $q_h'$ of the head posture, from the right of the fixed parameter $q_t$.

[Math. 3]

$$q^*_t = q_t q_{hc}^{-1} q'_h \quad (3)$$

Then, a display angle of view depending on the parameter $q_t^*$ is clipped from the captured image to render a free viewpoint image (F1710). The free viewpoint image rendered as described above is transmitted from the image processing device 1040 to the display device 1020, and the display device 1020 displays it (F1711).

Furthermore, the present inventors have found that the problem of delay or discrepancy between posture and viewing angle in the video see-through image display system 100 can be solved by a combination of three-dimensional reconfiguration technology including Visual SLAM as a typical example and the head motion tracking prediction. The Visual SLAM is technology capable of performing camera self-position estimation and cartography simultaneously under unknown environment. An example of the Visual SLAM can include integrated augmented reality technology, "SmartAR" (trademark of Sony Corporation).

In the imaging device 1040, the omnidirectional camera 1031 attached to the user's head (or other body parts of the user) continues capturing, and thus can obtain time-series image data. In the image processing device 1040, a three-dimensional model of the surrounding environment is constructed from the time-series image data using the Visual SLAM technology and the current position of the camera in the three-dimensional model is found. Then, if the current eye position and posture of the user is predicted in consideration of the delay time δ from capturing to displaying it on the display device 1020, the image processing device 1040 renders an image captured by a virtual camera at the predicted position, and the display device 1020 displays it.

Figure 18:
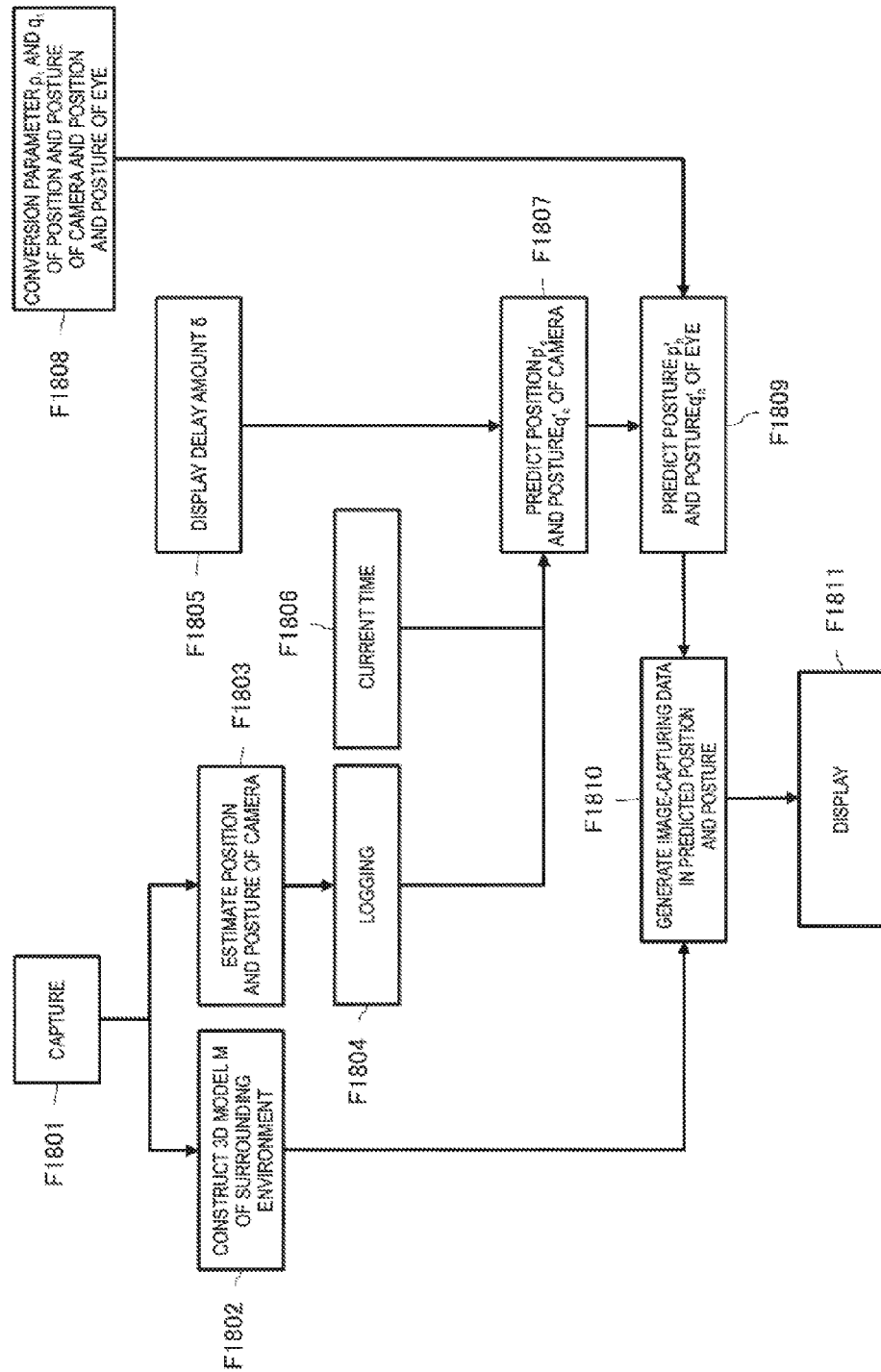
FIG. 18 is a diagram illustrating a processing procedure for displaying an image that matches a viewing angle of the user by combining three-dimensional reconstruction technique and head motion tracking prediction in consideration of delay time between image capturing and displaying.

FIG. 18 illustrates a processing procedure for displaying an image that matches the viewing angle of the user in consideration of the delay time from capturing to displaying using a combination of the three-dimensional reconfiguration technology and the head motion tracking prediction.

The omnidirectional camera 1031 of the image capturing device 1030 attached to the user captures an omnidirectional image (F1801).

In the image processing device 1040, a three-dimensional model M of the surrounding environment is constructed from the time-series image data using the Visual SLAM technology (F1802), a camera position $p_c$ and a camera posture $q_c$ in capturing in the three-dimensional model are estimated (F1803), and they are logged in association with each of capturing time information items (F1804).

Next, the delay time δ from the current time to displaying an image on the display optical system is approximated (F1805). On the basis of the current time (F1806) and the estimation values $p_c$ and $q_c$ of the camera position and posture logged in F1804, a camera position $p'_c$ and a camera posture $q'_c$ at the time when the subsequent display is performed are predicted (F1807). Furthermore, conversion parameters $p_t$ and $q_t$ for the position and posture of the omnidirectional camera 1031 and the position and posture of the user's eye are acquired (F1808). The conversion parameters $p_t$ and $q_t$ are fixed parameters determined by mechanical arrangement of the display optical system and the camera capturing system. Moreover, the conversion parameter $p_t$ is a three-dimensional vector that applies an offset of the coordinate position, and the conversion parameter $q_t$ is a quaternion that represents a change in posture. Then, as shown in the following formula (4), a user's eye position $p'_h$ and a user's eye posture $q'_h$ at the time when the subsequent display is performed are predicted from a predicted value $p'_c$ of the camera position and a predicted value $q'_c$ of the camera posture at the time, using the conversion parameters $p_t$ and $q_t$ (F1809).

[Math. 4]

$$\left. \begin{array}{l} p'_h = p'_c + p_t \\ q'_h = q'_c \cdot q_t \end{array} \right\} \quad (4)$$

Then, in the image processing device 1040, image capturing data in the predicted eye position $p'_h$ and posture $q'_h$ is rendered using the three-dimensional model M of the surrounding environment constructed in F1802 (F1810). The free viewpoint image rendered as described above is transmitted from the image processing device 1040 to the display device 1020, and the display device 1020 displays it (F1811).

As described above, according to the processing procedure shown in FIGS. 17 and 18, it is possible to solve the problem of delay or discrepancy between posture and viewing angle in the video see-through image display system 100. Consequently, in a video see-through image, it is possible to prevent the VR sickness by reducing misalignment such as optical axis discrepancy. Furthermore, the degree of freedom in camera selection or arrangement is improved, and thus effects as listed in the following items (1) to (4) can be obtained.

(1) Alignment between camera and eye's optical axis is unnecessary.

(2) Agreement between camera and eye's posture is unnecessary.

(3) Alignment between camera and eye's viewing angle is unnecessary.

(4) Arrangement of any number of cameras is possible.

Although the image display system 100 illustrated in FIG. 1 is configured to include the camera mounted on the moving object device 120 and the head-mounted display 110 through which the user views an image captured by the camera while being attached to the user's head, it can be used as a camera system of the moving object device 120 that is remotely operated by the user using the controller 130.

In a typical remote operation system, any possible movement of the moving object device 120 can be operated using the controller 130. However, in the case where the remote operation is performed while an image captured by the camera mounted on the moving object device 120 is viewed, if the moving object device 120 performs a motion against the user's intention or an unintended motion, the user is likely to experience VR sickness.

Meanwhile, in the technology disclosed herein, the VR sickness is prevented by restricting the control degree of freedom of the moving object device 120 by the user. In one example, the trajectory of the moving object device 120 in a space is specified, and only one of position, velocity, and acceleration on the trajectory is operated remotely.

In the following, an embodiment in which the image display system 100 is operated as a remote operation camera system capable of restricting the control degree of freedom is described. In one example, the aerial moving object device 120, such as helicopter and multicopter equipped with three or more rotors, is assumed to be a target of remote operation, and the control degree of freedom is restricted only to a straight or circular motion. Then, the user remotely operates only velocity or acceleration on a trajectory in a straight or circular motion using an input device such as joystick that is made easy to operate as the controller 130.

Figure 19:
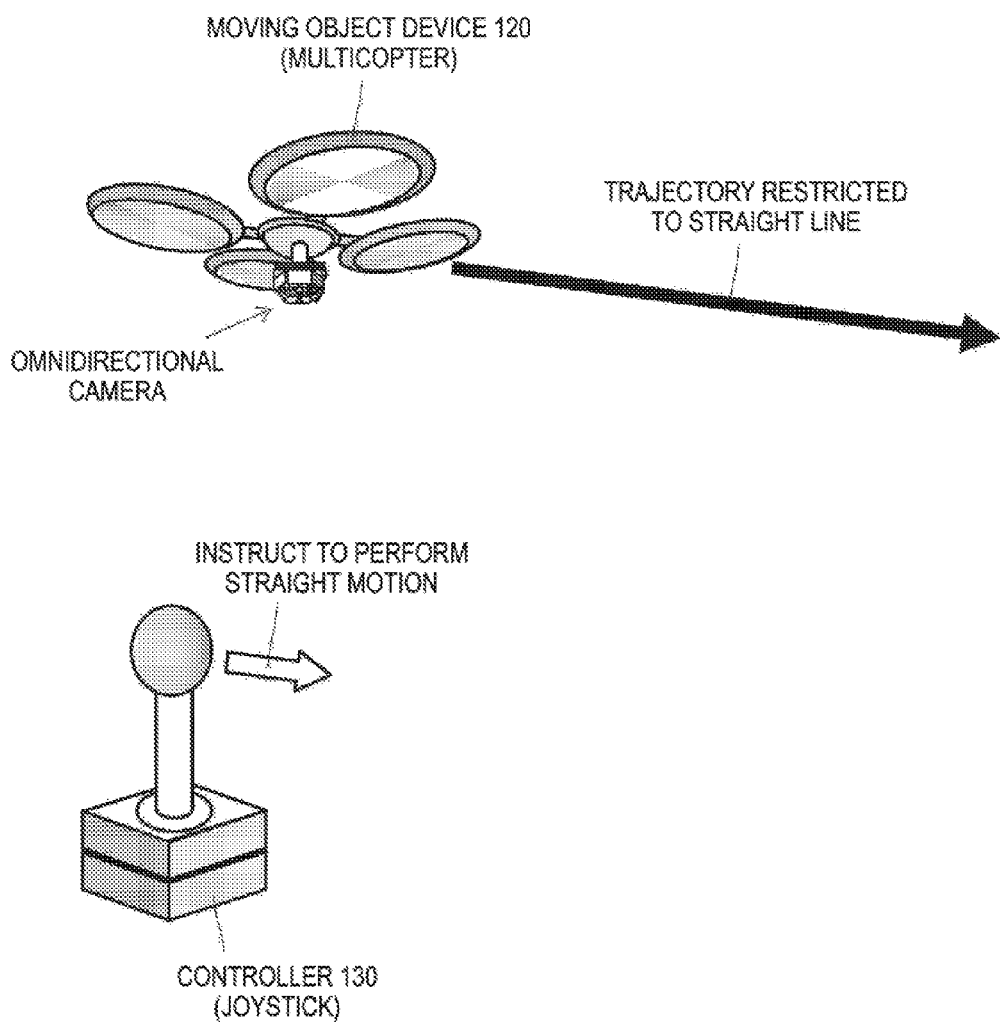
FIG. 19 is a diagram illustrating how to operate remotely a moving object device 120 using a controller 130 by restricting the control degree of freedom of the moving object device 120 to a straight motion.
Figure 20:
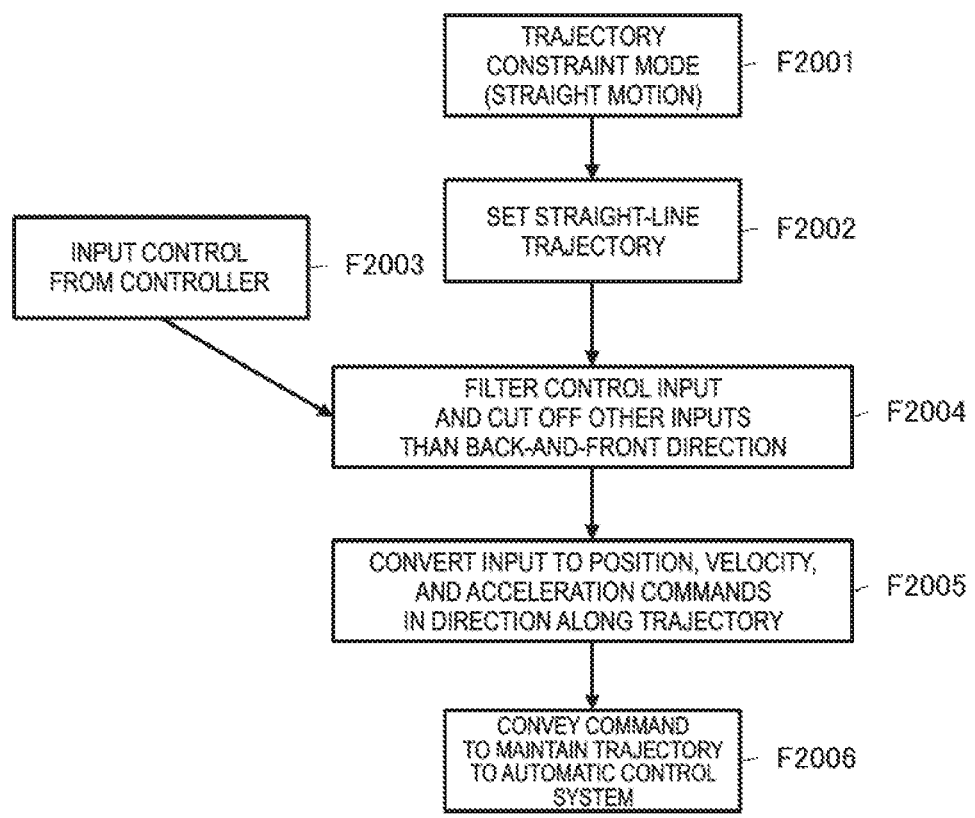
FIG. 20 is a diagram illustrating a processing procedure for controlling the remote operation by restricting the control degree of freedom of the moving object device 120 to a straight motion.

A remote operation using the controller 130 in a case where the control degree of freedom of the moving object device 120 is restricted to a straight motion as illustrated in FIG. 19 is described. FIG. 20 illustrates a processing procedure for controlling the moving object device 120 in the case described above.

When a trajectory constraint mode with a restriction to a straight motion is started (F2001), the trajectory of the moving object device 120 is set (F2002). In the case where the trajectory of the moving object device 120 is restricted to the straight motion, in one example, a straight-line trajectory as listed in the following item (1) or (2) is set.

(1) Straight line directed toward current direction of travel through current point (2) Straight line connecting current point and destination point If control is inputted from the controller 130 such as joystick (F2003), the control input is filtered, and other control inputs than a back-and-front direction are cut off (F2004).

Subsequently, the control input is converted to a position command, velocity command, or acceleration command along the straight-line trajectory that is set in F2002 (F2005), and a command to maintain the trajectory is conveyed to an automatic control system of the moving object device 120 (F2006).

Figure 21:
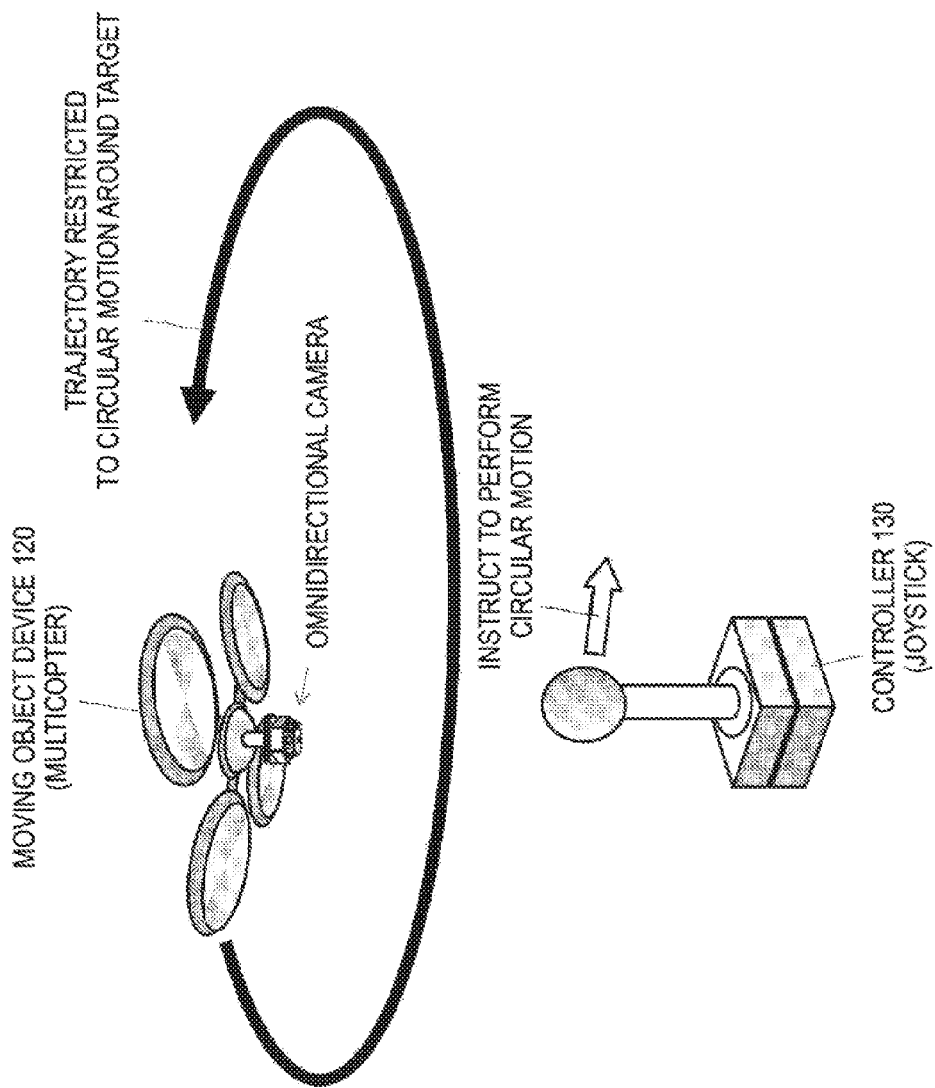
FIG. 21 is a diagram illustrating how to operate remotely the moving object device 120 using the controller 130 by restricting the control degree of freedom of the moving object device 120 to a circular motion.
Figure 22:
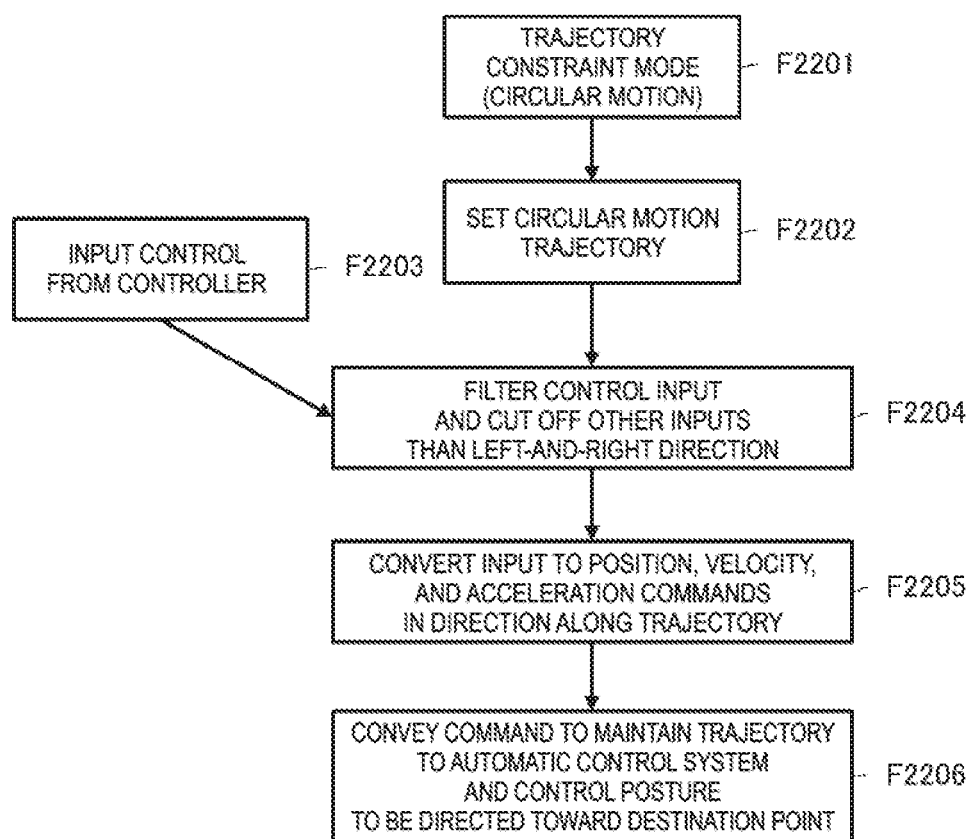
FIG. 22 is a diagram illustrating a processing procedure for controlling the remote operation by restricting the control degree of freedom of the moving object device 120 to a circular motion.

Next, a remote operation using the controller 130 in a case where the control degree of freedom of the moving object device 120 is restricted to a circular motion as illustrated in FIG. 21 is described. FIG. 22 illustrates a processing procedure for controlling the moving object device 120 in the case described above.

When a trajectory constraint mode with a restriction to a circular motion is started (F2201), the trajectory of the moving object device 120 is set (F2202). In the case where the trajectory of the moving object device 120 is restricted to the circular motion, in one example, a circular trajectory as listed in the following item (1) or (2) is set.

(1) Circular motion through current point centered on destination point (2) Circular motion in horizontal plane passing through current point centered on perpendicular axis intersecting destination point If control is inputted from the controller 130 such as joystick (F2203), the control input is filtered, and other control inputs than a left-and-right direction are cut off (F2204).

Subsequently, the control input is converted to a position command, velocity command, or acceleration command along the circular trajectory that is set in F2202 (F2205). A command to maintain the trajectory is conveyed to an automatic control system of the moving object device 120 and the posture of the moving object device 120 is controlled to be directed toward a destination point (F2206).

INDUSTRIAL APPLICABILITY

The foregoing thus describes the technology disclosed in this specification in detail and with reference to specific embodiments. However, it is obvious that persons skilled in the art may make modifications and substitutions to these embodiments without departing from the spirit of the technology disclosed in this specification.

Although the technology disclosed herein can be preferably applied in viewing an image captured by a remote camera mounted on a moving object device or the like using an immersive head-mounted display, it is certainly applicable to a see-through head-mounted display.

Furthermore, the technology disclosed herein is similarly applicable to a case where an image captured by a camera mounted on the main body of a head mounted-display rather than a remote camera is viewed using video see-through visualization.

Moreover, the technology disclosed herein is similarly applicable to a case where an image captured by a camera is viewed through a screen of an information terminal such as smartphones and tablets fixed to the head or face rather than a head-mounted display.

The technology described herein is preferably applicable to any type of binocular and monocular head-mounted displays.

In short, the technology disclosed in this specification has been described by way of example, and it should not be construed as being limited to the description of this specification. The spirit of the technology disclosed in this specification should be determined in consideration of the claims.

Additionally, the present technology may also be configured as below.

(1)
An information processing device including:
a head posture acquisition unit configured to acquire information on head posture of a user;
a camera posture acquisition unit configured to acquire information on posture of a camera; and
an image rendering processor configured to generate an image to be displayed on a display device from an image captured by the camera based on the head posture of the user and the posture of the camera, the display device being fixed to a head or a face of the user.

(2)
The information processing device according to (1),
wherein the camera is mounted on a moving object device.

(3)
The information processing device according to any one of (1) and (2),
wherein the camera captures an omnidirectional image or a wide-angle image, and
the image rendering processor corrects the head posture of the user using the posture of the camera in capturing and generates an image obtained by clipping an angle of view depending on the corrected head posture of the user from the image captured by the camera.

(4)
The information processing device according to (1),
wherein the camera is fixedly mounted on the head or the face of the user.

(5)
The information processing device according to (4),
wherein the image rendering processor generates an image obtained by clipping an angle of view depending on a first conversion parameter from the image captured by the camera, the first conversion parameter being used to convert the posture of the camera to the head posture of the user.

(6)
The information processing device according to (5),
wherein the image rendering processor performs image generation using the head posture of the user at a time when the camera performs capturing and the head posture of the user predicted after a lapse of delay time until an image is displayed on the display device.

(7)
The information processing device according to (4),
wherein the image rendering processor constructs a three-dimensional model of surrounding environment based on data of time-series image captured by the camera, estimates a current position of the camera in the three-dimensional model, predicts a position and posture of an eye of the user after a lapse of delay time from capturing by the camera to displaying on the display device using a second conversion parameter used to convert a position and posture of the camera to the position and posture of the eye of the user, and generates an image captured in a predicted position and posture of the eye from the three-dimensional model.

(8)
The information processing device according to (1), further including:
a controller configured to remotely operate the moving object device; and
a filter configured to constrain a trajectory of the moving object device and cut off an input other than the constrained trajectory from the controller,
wherein the input from the controller is converted to a position command, a velocity command, or an acceleration command in a direction along the constrained trajectory for transmitting to the moving object device.

(9)
The information processing device according to (8),
wherein, when the trajectory of the moving object device is constrained to a straight motion, the filter cuts off an input other than a back-and-front direction from the controller, and transmits a command to maintain a trajectory of the straight motion to the moving object device.

(10)

The information processing device according to (9), wherein the trajectory is set to a straight line toward a current direction of travel through a current point of the moving object or to a straight line connecting the current point of the moving object device and a destination point.

(11)

The information processing device according to (8), wherein, when the trajectory of the moving object device is constrained to a circular motion, the filter cuts off an input other than a left-and-right direction from the controller, and transmits a command to maintain a trajectory of the circular motion to the moving object device and controls posture of the moving object device to be directed toward a destination point.

(12)

The information processing device according to (11), wherein the trajectory is set to a circular motion passing through a current point of the moving object device centered on a destination point or to a circular motion in a horizontal plane through the current point of the moving object device centered on a perpendicular axis intersecting a destination point.

(13)

A method of information processing, the method including:

a head posture acquisition step of acquiring information on head posture of a user;

a camera posture acquisition step of acquiring information on posture of a camera; and an image rendering processing step of generating an image to be displayed on a display device from an image captured by the camera based on the head posture of the user and the posture of the camera, the display device being fixed to a head or a face of the user.

(14)

An image display system including:

a camera;

a display device used while being fixed to a head or a face of a user; and an image processing device configured to generate an image to be displayed on the display device from an image captured by the camera based on the head posture of the user and the posture of the camera.

REFERENCE SIGNS LIST 100 image display system
110 head-mounted display
120 moving object device
130 controller
400 omnidirectional camera
401-406 video camera
410 image processor
810 head motion tracking device
811 sensor unit
812 posture angle calculation unit
813 communication unit
820 display device
821 first communication unit
822 image rendering processor
823 display unit
824 second communication unit
830 image capturing device
831 omnidirectional camera
832 sensor unit
833 posture angle calculation unit
834 communication unit
1010 head motion tracking device
1011 sensor unit
1012 posture angle calculation unit
1013 communication unit
1020 display device
1021 communication unit
1023 display unit
1030 image capturing device
1031 omnidirectional camera
1032 sensor unit
1033 posture angle calculation unit
1034 communication unit
1040 image processing device
1041 communication unit
1042 image rendering processor

The invention claimed is:

1. An information processing device comprising:

a first sensor to acquire information on head posture of a user;

a second sensor to acquire information on posture of an omnidirectional camera; and an image rendering processor configured to generate an image to be displayed on a display device from an image captured by the camera based on the head posture of the user and the posture of the camera, the display device being fixed to a head or a face of the user, further comprising:

a controller configured to remotely operate a moving object device; and a filter configured to constrain a trajectory of the moving object device and cut off an input other than the constrained trajectory from the controller, wherein the input from the controller is converted to a position command, a velocity command, or an acceleration command in a direction along the constrained trajectory for transmitting to the moving object device, and wherein, when the trajectory of the moving object device is constrained to a straight motion, the filter cuts off an input other than a back-and-front direction from the controller, and transmits a command to maintain a trajectory of the straight motion to the moving object device.

2. The information processing device according to claim 1, wherein the trajectory is set to a straight line toward a current direction of travel through a current point of the moving object or to a straight line connecting the current point of the moving object device and a destination point.

3. The information processing device according to claim 1, wherein, when the trajectory of the moving object device is constrained to a circular motion, the filter cuts off an input other than a left-and-right direction from the controller, and transmits a command to maintain a trajectory of the circular motion to the moving object device and controls posture of the moving object device to be directed toward a destination point.

4. The information processing device according to claim 3,
wherein the trajectory is set to a circular motion passing through a current point of the moving object device centered on a destination point or to a circular motion in a horizontal plane through the current point of the moving object device centered on a perpendicular axis intersecting a destination point.

5. An information processing device comprising:
a first sensor to acquire information on head posture of a user;
a second sensor to acquire information on posture of a camera that is mounted on a moving object device;
an image rendering processor configured to generate an image to be displayed on a display device from an image captured by the camera based on the head posture of the user and the posture of the camera, the display device being fixed to a head or a face of the user;
a controller configured to remotely operate the moving object device; and
a filter configured to constrain a trajectory of the moving object device and cut off an input other than the constrained trajectory from the controller,
wherein the input from the controller is converted to a position command, a velocity command, or an acceleration command in a direction along the constrained trajectory for transmitting to the moving object device, and
wherein, when the trajectory of the moving object device is constrained to a straight motion, the filter cuts off an input other than a back-and-front direction from the controller, and the information processing device transmits a command to maintain a trajectory of the straight motion to the moving object device.

6. The information processing device according to claim 5,
wherein the trajectory is set to a straight line toward a current direction of travel through a current point of the moving object or to a straight line connecting the current point of the moving object device and a destination point.

7. An information processing device comprising:
a first sensor to acquire information on head posture of a user;
a second sensor to acquire information on posture of a camera that is mounted on a moving object device;
an image rendering processor configured to generate an image to be displayed on a display device from an image captured by the camera based on the head posture of the user and the posture of the camera, the display device being fixed to a head or a face of the user;
a controller configured to remotely operate the moving object device; and
a filter configured to constrain a trajectory of the moving object device and cut off an input other than the constrained trajectory from the controller,
wherein the input from the controller is converted to a position command, a velocity command, or an acceleration command in a direction along the constrained trajectory for transmitting to the moving object device, and
wherein, when the trajectory of the moving object device is constrained to a circular motion, the filter cuts off an input other than a left-and-right direction from the controller, and the information processing device transmits a command to maintain a trajectory of the circular motion to the moving object device and controls posture of the moving object device to be directed toward a destination point.

8. The information processing device according to claim 7,
wherein the trajectory is set to a circular motion passing through a current point of the moving object device centered on a destination point or to a circular motion in a horizontal plane through the current point of the moving object device centered on a perpendicular axis intersecting a destination point.

* * * * *